(12) United States Patent
Yang et al.

(10) Patent No.: US 11,494,044 B2
(45) Date of Patent: Nov. 8, 2022

(54) DISPLAY DEVICE

(71) Applicant: Samsung Display Co., LTD., Yongin-si (KR)

(72) Inventors: Sung Jin Yang, Cheonan-si (KR); Hyun Sik Park, Cheonan-si (KR); Hwan Hee Jeong, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/199,464

(22) Filed: Mar. 12, 2021

(65) Prior Publication Data

US 2021/0357082 A1 Nov. 18, 2021

(30) Foreign Application Priority Data

May 14, 2020 (KR) .......................... 10-2020-0057876

(51) Int. Cl.
*G06F 3/044* (2006.01)

(52) U.S. Cl.
CPC .......... *G06F 3/0448* (2019.05); *G06F 3/0443* (2019.05); *G06F 3/0446* (2019.05)

(58) Field of Classification Search
None
See application file for complete search history.

(56) References Cited

U.S. PATENT DOCUMENTS

| 7,471,351 | B2 | 12/2008 | Choi |
| 8,686,409 | B2 | 4/2014 | Lee et al. |
| 2011/0057893 | A1 | 3/2011 | Kim et al. |
| 2014/0210784 | A1* | 7/2014 | Gourevitch ........... G06F 3/0443 345/174 |
| 2018/0032188 | A1 | 2/2018 | Park et al. |
| 2019/0369810 | A1* | 12/2019 | Shi ........................ G06F 3/0443 |
| 2019/0369811 | A1* | 12/2019 | Hsu ........................ G06F 3/0445 |

FOREIGN PATENT DOCUMENTS

| KR | 10-0382456 | 11/2001 |
| KR | 2011-0025374 | 3/2011 |
| KR | 10-1976066 | 12/2013 |

* cited by examiner

*Primary Examiner* — Carl Adams
(74) *Attorney, Agent, or Firm* — H.C. Park & Associates, PLC

(57) ABSTRACT

A display device includes: a base member; first sensing electrodes disposed on the base member and electrically connected to a first sensing line, wherein the first sensing electrodes include first and second ends facing and spaced apart from each other; a second sensing electrode disposed between the first and second ends of the first sensing electrodes on a same layer as the first sensing electrodes and electrically connected to a second sensing line; and a connection electrode to electrically connect the first and second ends of the first sensing electrodes to each other without overlapping regions between each of the first and second ends of the first sensing electrodes and the second sensing electrode.

20 Claims, 17 Drawing Sheets

CE: CEa, CEb, CEc

CE1: CE1a, CE1b, CE1c
CE2: CE2a, CE2b, CE2c

TCE: TCEa, TCEb, TCEc

TCE1: TCE1a, TCE1b, TCE1c
TCE2: TCE2a, TCE2b, TCE2c

TE: TE1, TE2
RE: RE1, RE2

DISPLAY DEVICE

CROSS REFERENCE TO RELATED APPLICATION

This application claims priority from and the benefit of Korean Patent Application No. 10-2020-0057876 filed on May 14, 2020, which is hereby incorporated by reference for all purposes as if fully set forth herein.

BACKGROUND

Field

Implementations of the invention relate generally to display devices, and more specifically, to display devices including touch sensing units.

Discussion of the Background

As the information-oriented society evolves, various demands for display devices are ever increasing. For example, the display devices are being employed by a variety of electronic devices such as smart phones, digital cameras, laptop computers, navigation devices, and smart televisions. The display devices may be flat panel display devices such as a liquid-crystal display device, a field emission display device, and an organic light-emitting display device. A light-emitting display device may include a light-emitting element so that each of the pixels of the display panel may emit light by themselves. Accordingly, the light-emitting display device may display images without a backlight unit that supplies light to the display panel.

Recently, a touch sensing unit that recognizes a touch input has been widely employed for the input means of the electronic devices such as a smartphone and a tablet PC including the display devices. The touch sensing unit determines whether a user's touch input is received, and finds the coordinates of the position of the touch input. The touch sensing unit may include touch electrodes.

The above information disclosed in this Background section is only for understanding of the background of the inventive concepts, and, therefore, it may contain information that does not constitute prior art.

SUMMARY

Applicant realized that static electricity may occur between touch electrodes of a touch sensing unit when the touch sensing unit and/or a display device including the touch sensing unit operates, which may cause an insulating layer covering the touch electrodes to be damaged.

Display devices constructed according to the principles and implementations of the invention can improve touch sensitivity. For example, the display device may include first electrodes such as driving electrodes, a second electrode such as a sensing electrode, and a connection electrode to connect the first electrodes to each other. The connection electrode may have a shape to prevent a short-circuit between portions of the electrodes near regions between the first electrodes and the second electrode, thereby improving the touch sensitivity and reliability. For example, the first electrodes may include first and second ends spaced apart from each other with the second electrode therebetween, and the connection electrode may electrically connect the first and second ends to each other without overlapping regions between the second electrode and each of the first and second ends of the first electrodes. Accordingly, it is possible to prevent the short-circuit between the connection electrode and the second electrode even when an insulating layer covering the driving electrodes and the sensing electrode is damaged at the regions due to static electricity.

Additional features of the inventive concepts will be set forth in the description which follows, and in part will be apparent from the description, or may be learned by practice of the inventive concepts.

According to one aspect of the invention, a display device includes: a base member; first sensing electrodes disposed on the base member and electrically connected to a first sensing line, wherein the first sensing electrodes include first and second ends facing and spaced apart from each other; a second sensing electrode disposed between the first and second ends of the first sensing electrodes on a same layer as the first sensing electrodes and electrically connected to a second sensing line; and a connection electrode to electrically connect the first and second ends of the first sensing electrodes to each other without overlapping regions between each of the first and second ends of the first sensing electrodes and the second sensing electrode.

The regions may include gaps and the connection electrode may include: a first connection portion connected to the first end of the first sensing electrodes that faces one of the gaps; a second connection portion bent from the first connection portion; and a third connection portion bent from the second connection portion and connected to the second end of the first sensing electrodes that faces the other one of the gaps.

The second connection portion may be parallel to the first sensing electrodes and may not overlap the first sensing electrodes.

The second connection portion may intersect the second sensing electrode at a point spaced apart from the gaps.

Each of the first connection portion and the third connection portion may be parallel to the second sensing electrode.

The regions may include gaps and the connection electrode may include: a first connection electrode extending around the gaps on one side thereof to electrically connect the first and second ends of the first sensing electrodes to each other; and a second connection electrode extending around the gaps on an opposite side thereof to electrically connect the first and second ends of the first sensing electrodes to each other.

The first connection electrode and the second connection electrode may have a closed loop shape surrounding the gaps.

The first connection electrode and the second connection electrode may be symmetrical with respect to an extension line passing through the first and second ends of the first sensing electrodes.

Each of the first and second connection electrodes may include: a first connection portion connected to the first end of the first sensing electrodes that faces one of the gaps; a second connection portion bent from the first connection portion; and a third connection portion bent from the second connection portion and connected to the second end of the first sensing electrodes that faces the other one of the gaps.

The second connection portion of each of the first and second connection electrodes may intersect the second sensing electrode at a point spaced apart from the gaps.

Each of the first and second ends of the first sensing electrodes may be disposed on an extension line passing through a first direction, and the second sensing electrode may extend in a second direction crossing the first direction between the first and second ends of the first sensing electrodes.

The display device may further include: a dummy pattern disposed on the same layer as the first sensing electrodes and the second sensing electrode, and having a mesh shape consisting of electrodes extending in the first direction and electrodes extending in the second direction.

According to another aspect of the invention, a display device includes: a base member; first driving electrodes disposed on the base member and electrically connected to a first sensing line, wherein the first driving electrodes include first and second ends facing and spaced apart from each other; second driving electrodes disposed on the first driving electrodes and electrically connected to the first driving electrodes; a first sensing electrode disposed between the first and second ends of the first driving electrodes on a same layer as the first driving electrodes and electrically connected to a second sensing line; a second sensing electrode disposed on a same layer as the second driving electrodes and electrically connected to the first sensing electrode; and a connection electrode to electrically connect the first and second ends of the first driving electrodes to each other. The connection electrode is disposed on the same layer as the second driving electrodes and extends around a portion of the first sensing electrode that face the first and second ends of the first driving electrodes.

The connection electrode may include: a first connection portion connected to the first end of the first driving electrodes; a second connection portion bent from the first connection portion; and a third connection portion bent from the second connection portion and connected to the second end of the first driving electrodes.

Portions of the second sensing electrode may be spaced apart from each other with the second connection portion therebetween.

The second connection portion may be parallel to the first driving electrodes or the second driving electrodes and may not overlap the first driving electrodes or the second driving electrodes.

The second connection portion may intersect the first sensing electrode at a point spaced apart from gaps disposed between the portion of the first sensing electrode and each of the first and second ends of the first driving electrodes.

The connection electrode may include: a first connection electrode extending around the portion of the first sensing electrode on one side thereof to electrically connect the first and second ends of the first driving electrodes to each other; and a second connection electrode extending around the portion of the first sensing electrode on an opposite side thereof to electrically connect the first and second ends of the first driving electrodes to each other.

Each of the first and second connection electrodes may include: a first connection portion connected to the first end of the first driving electrodes; a second connection portion bent from the first connection portion; and a third connection portion bent from the second connection portion and connected to the second end of the first driving electrodes.

The second connection portion of each of the first and second connection electrodes may intersect the first sensing electrode at a point spaced apart from gaps disposed between the portion of the first sensing electrode and each of the first and second ends of the first driving electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION OF THE EMBODIMENTS

Figure 1:
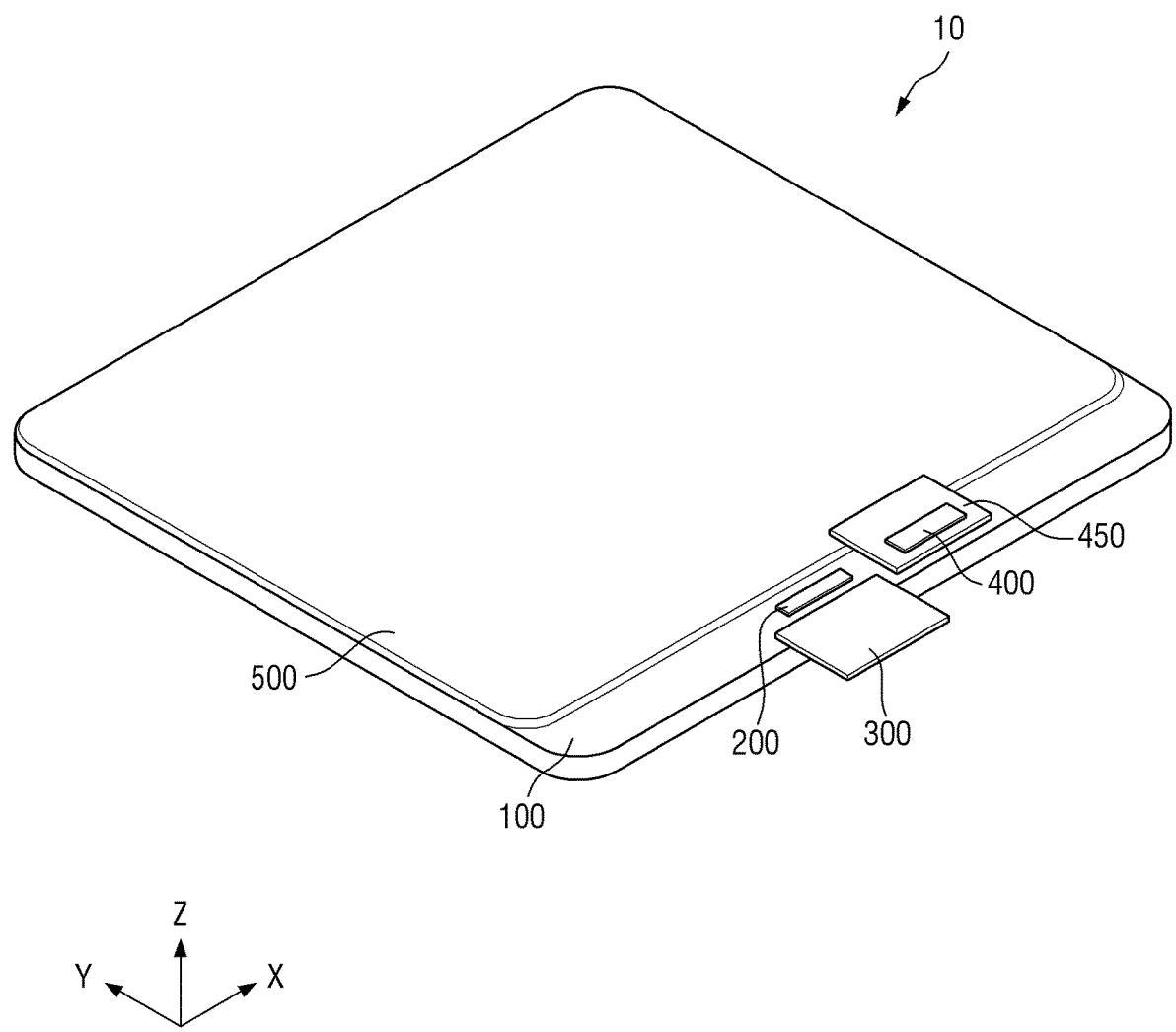
FIG. 1 is a perspective view of an embodiment of a display device.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an embodiment of a display device.

Referring to FIG. 1, a display device 10 may be employed by portable electronic devices such as a mobile phone, a smart phone, a tablet PC, a mobile communications terminal, an electronic notebook, an electronic book, a portable multimedia player (PMP), a navigation device and a ultra mobile PC (UMPC). For example, the display device 10 may be used as a display unit of a television, a laptop computer, a monitor, an electronic billboard, or the Internet of Things (TOT). For another example, the display device 10 may be applied to wearable devices such as a smart watch, a watch phone, a glasses-type display, and a head-mounted display (HMD) device. For another example, the display device 10 according to the embodiment may be used as a center information display (CID) disposed at the instrument cluster, the center fascia or the dashboard of a vehicle, as a room mirror display on the behalf of the side mirrors of a vehicle, as a display placed on the back of each of the front seats that is an entertainment system for passengers at the rear seats of a vehicle.

The first direction (x-axis direction) may be the longer side direction of the display device 10, for example, the horizontal direction of the display device 10. The second direction (y-axis direction) may be the shorter side direction of the display device 10, for example, the vertical direction of the display device 10. The third direction (z-axis direction) may refer to the thickness direction of the display device 10.

The display device 10 may have a shape similarly to a quadrangular shape when viewed from the top. For example, the display device 10 may have a shape similar to a quadrangle having longer sides in the first direction (x-axis direction) and shorter sides in the second direction (y-axis direction) when viewed from the top. The corners where the shorter sides in the first direction (x-axis direction) meet the longer sides in the second direction (y-axis direction) may be rounded with a predetermined curvature or may be a right angle. The shape of the display device 10 when viewed from the top is not limited to a quadrangular shape, but may be formed in a shape similar to other polygonal shapes, a circular shape, or an elliptical shape.

The display device 10 may include a display unit 100, a display driver 200, a display circuit board 300, a touch driver 400, a touch circuit board 450, and a touch sensing unit 500.

The display unit 100 may include a display area having pixels for displaying images, and a non-display area disposed around the display area. The display area of the display unit 100 may emit lights from a plurality of emission areas (or a plurality of openings). For example, the display unit 100 may include a pixel circuit such as a switching element, a pixel-defining layer defining emission areas of the display area, and a self-light-emitting element.

For example, the self-light-emitting element may include, but is not limited to, at least one of an organic light-emitting diode, a quantum-dot light-emitting diode, an inorganic-based micro light-emitting diode (e.g., micro LED), and an inorganic-based nano light-emitting diode (e.g., nano LED).

The non-display area of the display unit 100 may include display pads disposed at one edge of a base member or a substrate. The display pads may be electrically connected to the display circuit board 300. The display unit 100 will be described in detail with reference to FIGS. 2 and 3.

The display driver 200 may output signals and voltages for driving the display unit 100. The display driver 200 may supply data voltages to data lines. The display driver 200 may apply a supply voltage to a power line, and may supply scan control signals to the scan driver. The display driver 200 may be implemented as an integrated circuit (IC) and may be attached to the display unit 100 by a chip-on-glass (COG) technique, a chip-on-plastic (COP) technique, or ultrasonic bonding. For example, the display driver 200 may be attached on the exposed part of the display unit 100 that is not covered by the touch sensing unit 500. For another example, the display driver 200 may be attached to the circuit board 300.

The display circuit board 300 may be attached on the display pads of the display unit 100 using an anisotropic conductive film (ACF). Accordingly, the lead lines of the display circuit board 300 may be electrically connected to the display pads of the display unit 100. The display circuit board 300 may be a flexible printed circuit board (FPCB), a printed circuit board (PCB), or a flexible film such as a chip-on-film (COF).

The touch driver 400 may be connected to sensing electrodes (or touch electrodes) of the touch sensing unit 500. The touch driver 400 may apply touch driving signals to the sensing electrodes of the touch sensing unit 500 and may measure capacitances of the sensing electrodes. For example, the touch driving signals may have driving pulses. The touch driver 400 may not only determine whether a touch is input based on the capacitances of the sensing electrodes, but also calculate touch coordinates of the position where the touch is input. The touch driver 400 may be implemented as an integrated circuit (IC) and may be mounted on the touch circuit board 450.

The touch circuit board 450 may be attached on the touch pads of the touch sensing unit 500 using an anisotropic conductive film. Accordingly, the lead lines of the touch circuit board 450 may be electrically connected to the touch pads of the touch sensing unit 500. The touch circuit board 450 may be a flexible printed circuit board, a printed circuit board, or a flexible film such as a chip-on film.

The touch sensing unit 500 may be disposed on the display unit 100. The touch sensing unit 500 may have a rectangular shape having the longer sides in the first direction (x-axis direction) and the shorter sides in the second direction (y-axis direction) when viewed from the top. The corners where the shorter sides in the first direction (x-axis direction) meet the longer sides in the second direction (y-axis direction) may be a right angle or may be rounded with a predetermined curvature. For example, the shape of the touch sensing unit 500 when viewed from the top is not limited to a rectangular shape, but may be formed in other polygonal shapes, a circular shape, or an elliptical shape. The touch sensing unit 500 may overlap the display unit 100. For example, the shape of the touch sensing unit 500 may be similar to the shape of the display unit 100 when viewed from the top.

The touch sensing unit 500 may be, but is not limited to being, flat. The touch sensing unit 500 may include curved portions formed at left and right ends thereof. The curved portions may have a constant curvature or varying curvatures. In addition, the touch sensing unit 500 may be formed to be flexible so that it can be curved, bent, folded or rolled, like the display unit 100.

The touch sensing unit 500 may include sensing electrodes that are disposed in a touch sensor area to sense a user's touch, and touch pads that are disposed in a touch peripheral area around the touch sensor area. The touch pads may be formed on the touch sensing unit 500 at one edge of the touch sensing unit 500 to be electrically connected to the touch circuit board 450.

The touch sensing unit 500 will be described in detail with reference to FIGS. 2 and 4.

Figure 2:
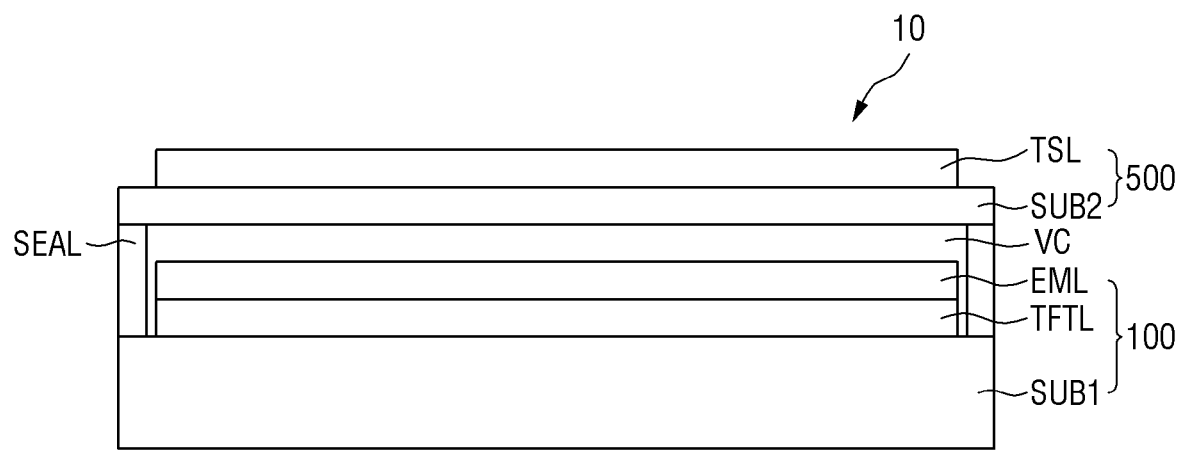
FIG. 2 is a cross-sectional view of the display device of FIG. 1.

For example, although the touch sensing unit 500 is a touch panel separated from the display unit 100 in the example shown in FIGS. 1 and 2, embodiments are not limited thereto. For another example, the touch sensing unit 500 may be disposed on an emission material layer of the display unit 100 and formed integrally with the display unit 100.

FIG. 2 is a cross-sectional view of the display device of FIG. 1.

Referring to FIG. 2, the display device 10 may include a display unit 100, a touch sensing unit 500, and a sealing member SEAL that attaches the display unit 100 to the touch sensing unit 500.

The display unit 100 may include a first substrate SUB1, a thin-film transistor layer TFTL, and an emission material layer EML.

A base member, which is in the form of the first substrate SUB1, may be made of an insulating material such as a polymer resin. The first substrate SUB1 may include a base substrate. For example, the first substrate SUB1 may be a rigid substrate. For another example, the first substrate SUB1 may be a flexible substrate that can be bent, folded, or rolled. When the first substrate SUB1 is a flexible substrate, it may be made of, but is not limited to, polyimide (PI).

The thin-film transistor layer TFTL may be disposed on the first substrate SUB1. The thin-film transistor layer TFTL may include scan lines, data lines, power lines, scan control lines, data connection lines for connecting the display driver 200 with data lines, pad connection lines for connecting the display driver 200 with the display pads, etc., as well as thin-film transistors forming the pixel circuits of the pixels. Each of the thin-film transistors may include a gate electrode, a semiconductor layer, a source electrode and a drain electrode. For example, when the scan driver is formed on one side of the non-display area NDA of the display unit 100, the scan driver may include thin-film transistors.

The thin-film transistor layer TFTL may be disposed in the display area and the non-display area. The thin-film transistors in the pixels, the scan lines, the data lines, and the power supply lines on the thin-film film transistor layer TFTL may be disposed in the display area DA. The scan control lines, the data connection lines, power supply lines, and the pad connection lines of the thin-film transistor layer TFTL may be disposed in the non-display area.

The emission material layer EML may be disposed on the thin-film transistor layer TFTL. The emission material layer EML may include pixels in each of which a first electrode, an emissive layer and a second electrode are stacked on one another sequentially to emit light, and a pixel-defining layer for defining the pixels. The pixels on the emission material layer EML may be disposed in the display area DA.

For example, the emissive layer may be an organic emissive layer containing an organic material. The emissive layer may include a hole transporting layer, an organic light-emitting layer and an electron transporting layer. When a voltage is applied to the first electrode and a cathode voltage is applied to the second electrode through the thin-film transistors on the thin-film transistor layer TFTL, the holes and electrons may move to the organic light-emitting layer through the hole transporting layer and the electron transporting layer, respectively, such that they combine in the organic light-emitting layer to emit light. For example, the first electrode may be an anode electrode while the second electrode may be a cathode electrode.

For another example, the emission material layer EML may include at least one of: a quantum-dot light-emitting diode, an inorganic-based micro light-emitting diode (e.g., micro LED), and an inorganic-based nano light-emitting diode (e.g., nano LED).

An air gap VC may be formed between the display unit 100 and the touch sensing unit 500. During a process of attaching the display unit 100 to the touch sensing unit 500 through the sealing member SEAL, the air gap VC may be formed between the display unit 100 and the touch sensing unit 500.

For another example, a filling layer may be disposed between the display unit 100 and the touch sensing unit 500. During the process of attaching the display unit 100 to the touch sensing unit 500 through the sealing member SEAL, the filling layer may be injected between the display unit 100 and the touch sensing unit 500. The filling layer may be, but is not limited to, an epoxy filling film or a silicon filling film.

The touch sensing unit 500 may include a second substrate SUB2 and a touch sensor layer TSL.

The second substrate SUB2 may be a base substrate or a base member and may be made of an insulating material such as a polymer resin. For example, the second substrate SUB2 may be a rigid substrate. When the second substrate SUB2 is a rigid substrate, the second substrate SUB2 may include, but is not limited to, a glass material or a transparent metal material.

The touch sensor layer TSL may be disposed on the second substrate SUB2. The touch sensor layer TSL may include sensing electrodes for sensing a user's touch by capacitive sensing, touch pads, and touch signal lines (or sensing lines) for connecting the touch pads with the sensing electrodes. For example, the touch sensor layer TSL can sense a user's touch by self-capacitance sensing or mutual capacitance sensing.

For another example, the touch sensor layer TSL may be disposed directly on an encapsulation layer of the display unit 100. In such case, the encapsulation layer of the display unit 100 may be the base member supporting the touch sensor layer TSL. Accordingly, the second substrate SUB2 supporting the touch sensor layer TSL may be eliminated.

The sensing electrodes of the touch sensor layer TSL may be disposed in the touch sensor area overlapping the display area of the display unit 100. The touch signal lines (or sensing lines) and the touch pads of the touch sensor layer TSL may be disposed in a touch peripheral area overlapping the non-display area of the display unit 100.

For example, a polarizing film and a cover window may be additionally disposed on the touch sensor layer TSL. The polarizing film may be disposed on the touch sensor layer TSL, and the cover window may be disposed on the polarizing film by an adhesive member.

The adhesive member SEAL may be interposed between the edge of the first substrate SUB1 and the edge of the second substrate SUB2 in the non-display area. The sealing member SEAL may be disposed along the edges of the first substrate SUB1 and the second substrate SUB2 in the non-display area to seal the air gap VC. The first substrate SUB1 and the second substrate SUB2 may be coupled with each other by the sealing member SEAL. For example, the sealing member SEAL may be, but is not limited to, a frit adhesive layer, an ultraviolet curable resin, or a thermosetting resin.

Figure 3:
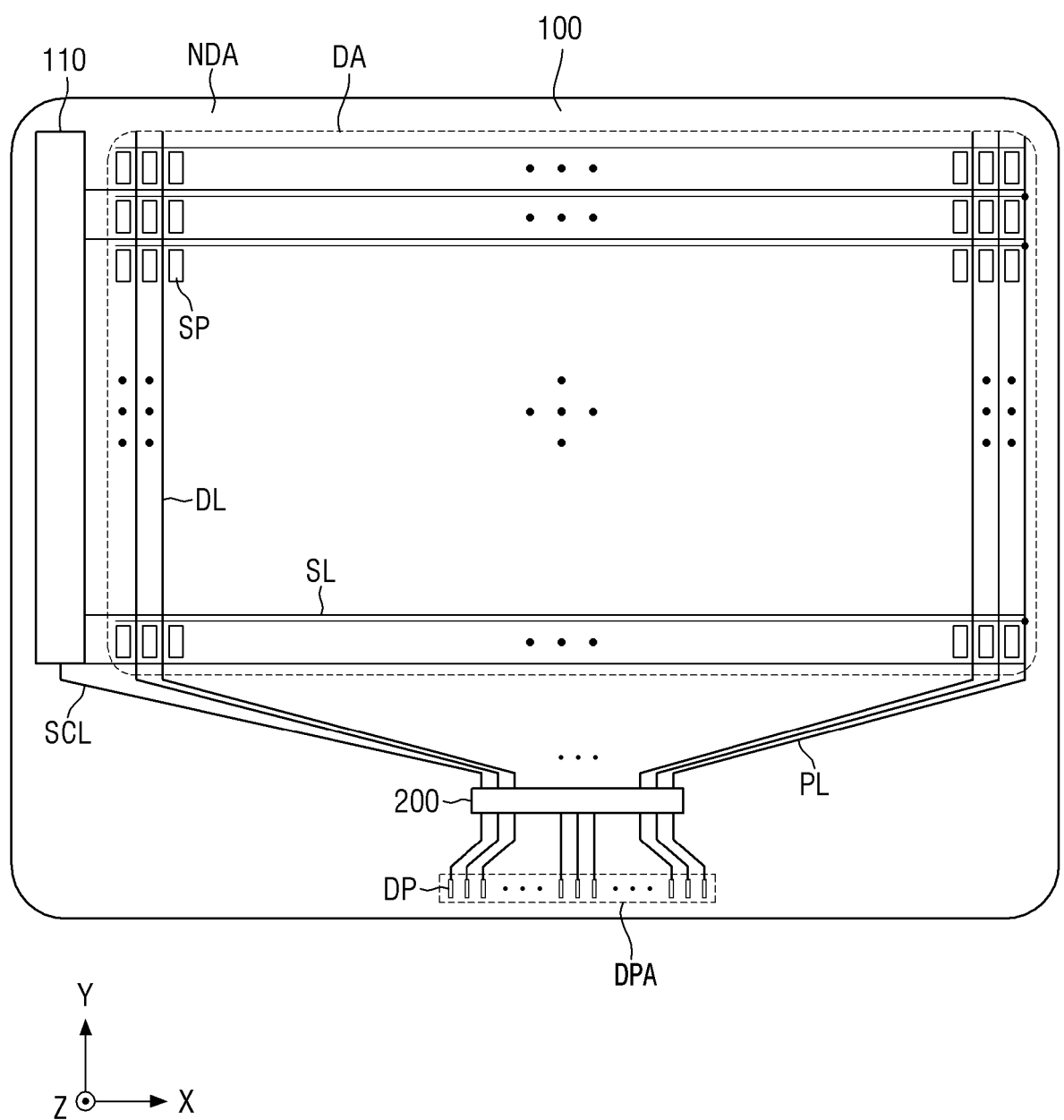
FIG. 3 is a plan view of an embodiment of the display unit of FIG. 1.

FIG. 3 is a plan view of an embodiment of the display unit of FIG. 1.

Referring to FIG. 3, the display unit 100 may include a display area DA where pixels are disposed to display images, and a non-display area NDA which is the peripheral area of the display area DA. The non-display area NDA may be defined as the area from the outer side of the display area DA to the edge of the display unit 100.

The scan lines SL, the data lines DL, the power lines PL and the pixels SP may be disposed in the display area DA. The scan lines SL may be arranged in the first direction (x-axis direction), while the data lines DL may be arranged in the second direction (y-axis direction) intersecting the first direction (x-axis direction). The power lines PL may include at least one vertical line in parallel with the data lines DL in the second direction (y-axis direction) and a plurality of horizontal lines branching off from the at least one vertical line in the first direction (x-axis direction).

Each of the pixels SP may be connected to at least one scan line SL, data line DL, and power line PL. Each of the pixels PX may include thin-film transistors including a driving transistor and at least one switching transistor, a light-emitting element, and a capacitor. When a scan signal is applied from a scan line SL, each of the pixels SP may receive a data voltage of a data line DL and may supply a driving current to the light-emitting element according to the data voltage applied to the gate electrode of the driving transistor, so that light is emitted.

The display unit 100 may include display pads DP, a scan driver 110, a scan control line SCL, data connection lines DLL, and pad connection lines disposed in the non-display area NDA. In addition, the display driver 200 may be disposed in the non-display area NDA of the display unit 100.

The display pads DP may be disposed at one edge of the first substrate SUB1. The display pads DP may be electrically connected to the display circuit board 300. The display pads DP may receive digital video data and timing signals from the display circuit board 300. The display pads DP may supply digital video data and timing signals to the display driver 200.

The scan driver 110 may be connected to the display driver 200 through at least one scan control line SCL. The scan driver 110 may receive a scan control signal from the display driver 200. The scan driver 110 may generate scan signals according to the scan control signal and may supply the scan signals to the scan lines SL.

For example, the scan driver 110 may be formed in the non-display area NDA on one outer side of the display area DA. However, embodiments are not limited thereto. For another example, the scan driver 110 may be formed in the non-display area NDA on each outer side of the display area DA.

The display driver 200 may be connected to the display pads DP of a display pad area DPA through display connection lines to receive digital video data and timing signals. The display driver 200 may convert the digital video data into analog data voltages and may supply them to the data lines DL through the data connection lines DLL. The display driver 200 may generate and supply a scan control signal for controlling the scan driver 110 through the scan control line SCL. The scan signals of the scan driver 110 may select pixels SP to be supplied with data voltages, and the selected pixels SP may receive data voltages. The display driver 200 may be implemented as an integrated circuit (IC) and may be attached to the first substrate SUB1 by a chip-on-glass (COG) technique, a chip-on-plastic (COP) technique, or ultrasonic bonding.

Figure 4:
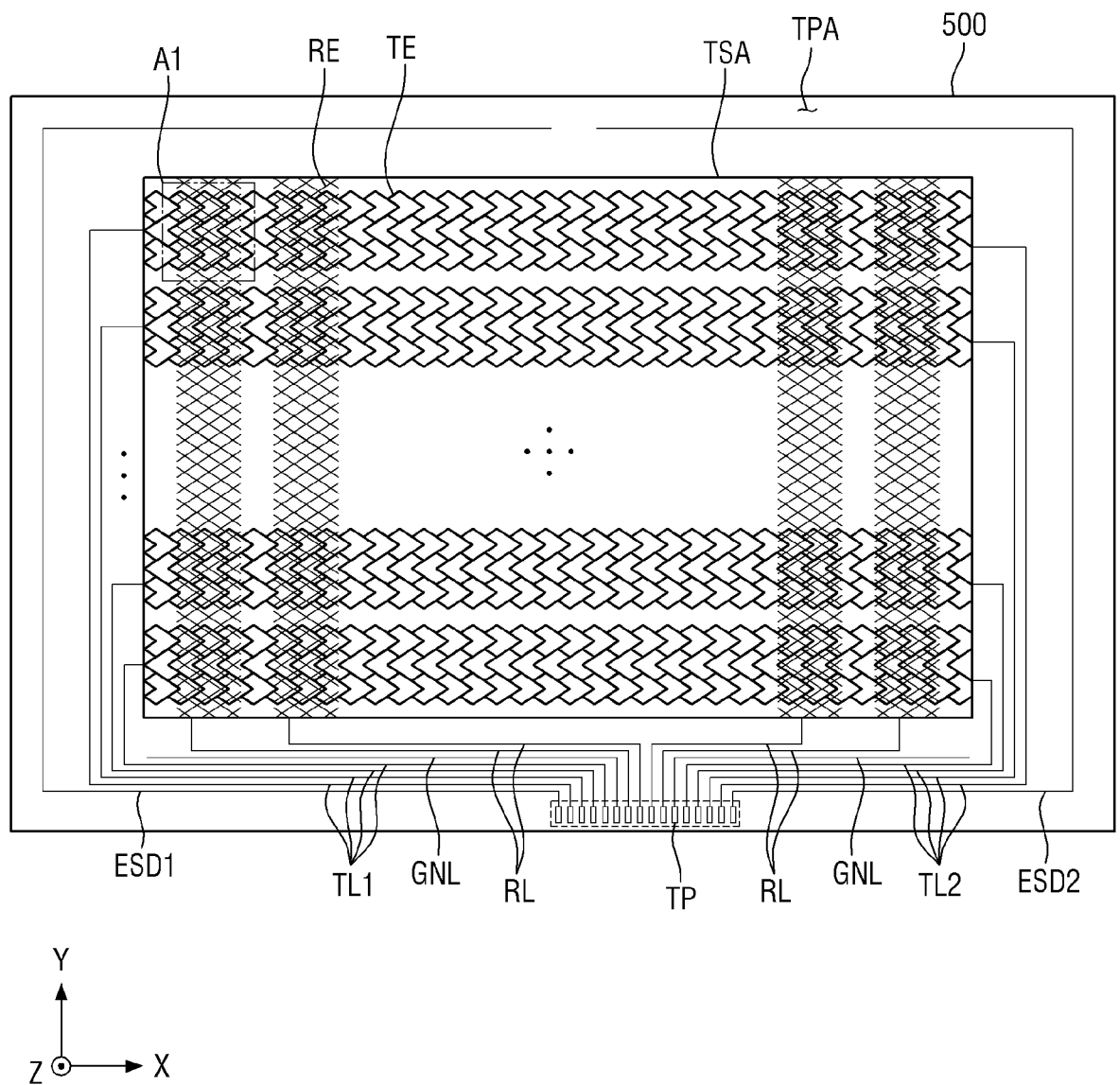
FIG. 4 is a plan view of an embodiment of the touch sensing unit of FIG. 1 constructed according to the principles of the invention.
Figure 5:
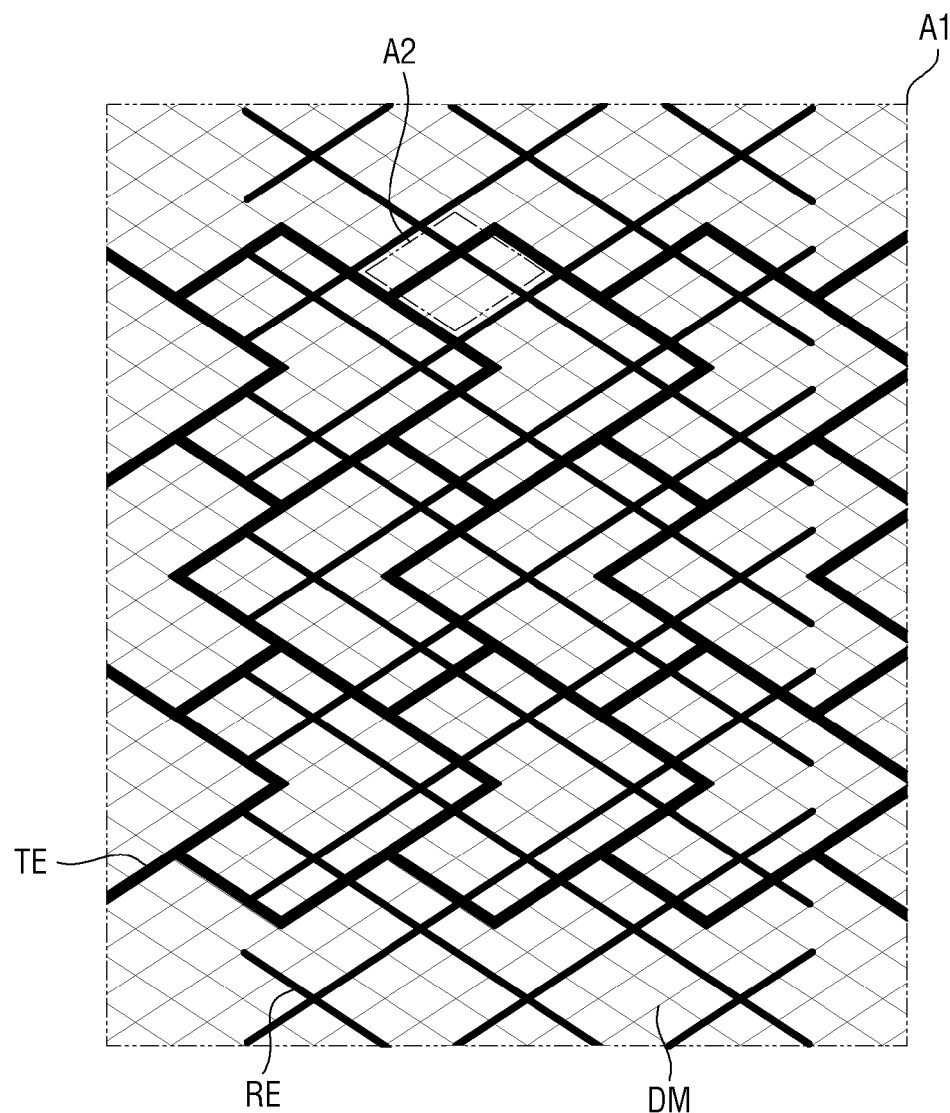
FIG. 5 is an enlarged view of area A1 of FIG. 4.

FIG. 4 is a plan view of an embodiment of the touch sensing unit of FIG. 1 constructed according to the principles of the invention. FIG. 5 is an enlarged view of area A1 of FIG. 4. It is to be noted that FIG. 5 shows a representative one of unit sensors of FIG. 4, and the configuration and shape of the unit sensor is not limited to that shown in FIG. 5.

Referring to FIGS. 4 and 5, the touch sensing unit 500 may include a touch sensor area TSA for sensing a user's touch, and a touch peripheral area TPA disposed around the touch sensor area TSA. The touch sensor area TSA may overlap with the display area DA of the display unit 100, and the touch peripheral area TPA may overlap with the non-display area NDA of the display unit 100.

The touch sensor area TSA may include first sensing electrodes and second sensing electrodes. The first sensing electrodes, which are in the form of driving electrodes TE, may receive touch driving signals from the touch driver 400. The touch driving signals may have touch driving pulses. The second sensing electrodes, which are in the form of the sensing electrodes RE, may measure the amount of a change in mutual capacitance formed between the driving electrode TE and the sensing electrode RE.

The touch sensor area TSA may further include a dummy pattern DM disposed between the plurality of driving electrodes TE, between the plurality of sensing electrodes RE, or between the driving electrodes TE and the sensing electrodes RE. The dummy pattern DM may be disposed on the same layer as the plurality of driving electrodes TE and the plurality of sensing electrodes RE, and may be spaced apart from the plurality of driving electrodes TE and the plurality of sensing electrodes RE. The dummy pattern DM may be electrically floating, and may adjust the basic capacitance of the touch sensor area TSA. For example, the touch sensing unit 500 may include the dummy pattern DM to improve the touch sensitivity by reducing the basic capacitance of the touch sensor area TSA.

The plurality of driving electrodes TE and the plurality of sensing electrodes RE may be made of the same material on the same layer, and may be insulated from each other. The driving electrodes TE may be connected to the first driving lines TL1 on one side of the touch sensor area TSA, and to the second driving lines TL2 on the opposite side of the touch sensor area TSA. For example, the driving electrodes TE may be connected to the first driving lines TL1 on left side of the touch sensor area TSA, and to the second driving lines TL2 on the right side of the touch sensor area TSA. The touch driver 400 supplies a touch driving signal to the plurality of driving electrodes TE through each of the first and second driving lines TL1 and TL2, thereby reducing the resistance-capacitance delay (RC delay) of the touch driving signal. Accordingly, the display device 10 can prevent a difference between the touch driving signals applied to the driving electrodes TE disposed on one side of the touch sensor area TSA and to the driving electrodes TE disposed on the opposite side of the touch sensor area TSA, thereby improving touch sensitivity.

The sensing electrodes RE may be connected to the sensing lines RL on another side of the touch sensor area TSA that is adjacent to one side or the other side thereof. For example, the sensing electrodes RE may be connected to the sensing lines RL on the lower side of the touch sensor area TSA that is adjacent to the touch pads TP. The touch driver 400 may measure the amount of a change in mutual capacitance formed between the driving electrodes TE and the sensing electrodes RE through the sensing lines RL. The touch driver 400 may determine whether a touch is input and/or the coordinates of the touch based on the amount of the change in mutual capacitance.

The driving electrodes TE may be arranged in the first direction (x-axis direction) and may be spaced apart from one another in the second direction (y-axis direction). The sensing electrodes RE may be arranged in the second direction (y-axis direction) and may be spaced apart from one another in the first direction (x-axis direction). The touch sensor area TSA may include a plurality of unit sensors each formed at the intersection of the driving electrode TE associated with a first driving line TL1 or a second driving line TL2 and the sensing electrode RE associated with a sensing line RL. For example, each of the plurality of unit sensors may be associated with a first driving line TL1 or a second driving line TL2 and a sensing line RL. However, embodiments are not limited thereto. The unit sensor may have, but is not limited to, the configuration of area A1 of FIG. 4 or FIG. 5. The plurality of unit sensors may be self-capacitance sensors or mutual-capacitance sensors.

The unit sensor may include a plurality of driving electrodes TE extended in the direction DR1 and/or the direction DR2, and a plurality of sensing electrodes RE extended in the direction DR1 and/or the direction DR2. Herein, the direction DR1 may be a direction between the first direction (x-axis direction) and the second direction (y-axis direction), and the direction DR2 may be a direction between the opposite direction of the first direction (x-axis direction) and the second direction (y-axis direction). In addition, the dummy pattern DM may include electrodes extended in the direction DR1 and electrodes extended in the direction DR2. For example, the plurality of driving electrodes TE, the plurality of sensing electrodes RE and the dummy pattern DM may be formed in a mesh structure when viewed from the top, The mesh structure may allow the plurality of driving electrodes TE, the plurality of sensing electrodes RE and the dummy pattern DM to have an reduced area overlapping the emission area of the display unit 100. Accordingly, the display device 10 can prevent the brightness of the light exiting from the emission area of the display unit 100 from being lowered by the touch sensing unit 500.

The unit sensor may include a plurality of regions where the driving electrodes TE intersect the sensing electrodes RE. At each of the intersections, the driving electrodes TE may be separated from each other with the sensing electrode RE therebetween, and the driving electrodes TE and the sensing electrode RE may be insulated from each other while being disposed on the same layer. Two ends of the driving electrodes TE spaced apart from each other with the sensing electrode RE therebetween may be electrically connected with each other by a connection electrode.

For example, when the plurality of driving electrodes TE and the plurality of sensing electrodes RE are driven by the mutual-capacitance sensing, the first driving lines TL1 and the second driving lines TL2 may supply touch driving signals to the driving electrodes TE, such that the mutual capacitance may be charged between the driving electrodes TE and the sensing electrodes RE. The touch driver 400 may measure the amount of a change in the mutual capacitance formed between the driving electrodes TE and the sensing electrodes RE through the sensing lines RL, and may determine whether a touch is input based on the amount of a change in the mutual capacitance.

For another example, when the plurality of driving electrodes TE and the plurality of sensing electrodes RE are driven in the self-capacitance sensing, the first driving lines TL1 and the second driving lines TL2 may supply touch driving signals to the driving electrodes TE as well as the sensing electrodes RE, such that the self-capacitance of the driving electrodes TE and the sensing electrodes RE may be charged. The touch driver 400 may measure the amount of a change in the self-capacitance through the first and second driving lines TL1 and TL2 and the sensing lines RL, and may determine whether there is a touch input based on the amount of a change in the self-capacitance.

In the following description, the touch driver 400 is driven by the mutual capacitive sensing, in which a plurality of touch driving signals is applied to the driving electrodes TE, and the amount of a change in the mutual capacitance is measured through the sensing lines RL connected to the sensing electrodes RE.

The first and second driving lines TL1 and TL2, the sensing lines RL, a ground line GNL, and first and second guard lines ESD1 and ESD2 may be disposed in the touch peripheral area TPA.

Ends of the first driving lines TL1 may be connected to driving electrodes TE disposed on one side of the touch sensor area TSA. For example, the ends of the first driving lines TL1 may be connected to driving electrodes TE disposed on the left side of the touch sensor area TSA. The other ends of the first driving lines TL1 may be connected to some of the touch pads TP. The first driving lines TL1 may be connected to the touch pads TP disposed on the lower side of the touch peripheral area TPA through one side of the touch peripheral area TPA. Accordingly, the first driving lines TL1 may connect the driving electrodes TE disposed on one side of the touch sensor area TSA with the touch pads TP.

Ends of the second driving lines TL2 may be connected to the driving electrodes TE disposed on the opposite side of the touch sensor area TSA. For example, the ends of the second driving lines TL2 may be connected to the driving electrodes TE disposed on the right side of the touch sensor area TSA. The other ends of the second driving lines TL2 may be connected to some others of the touch pads TP. The second driving lines TL2 may be connected to the touch pads TP disposed on the lower side of the touch peripheral area TPA through the opposite side of the touch peripheral area TPA. Accordingly, the second driving lines TL2 may connect the driving electrodes TE disposed on the opposite side of the touch sensor area TSA with some others of the touch pads TP.

The ends of the sensing lines RL may be connected to the sensing electrodes RE on another side of the touch sensor area TSA that is adjacent to one side or the other side thereof. For example, the ends of the sensing lines RL may be connected to the sensing electrodes RE on the lower side of the touch sensor area TSA. The other ends of the sensing lines RL may be connected to yet some others of the touch pads TP. Accordingly, the sensing lines RL may connect the sensing electrodes RE disposed on another side of the touch sensor area TSA with yet some others of the touch pads TP.

The touch pads TP may be disposed on one side of the second substrate SUB2. For example, the touch pads TP may be disposed on the lower side of the second substrate SUB2 or at the longer edge of the second substrate SUB2. The touch circuit board 450 may be attached on the touch pads TP using an anisotropic conductive film. Accordingly, the touch pads TP may be electrically connected to the touch circuit board 450.

The ground line GNL may be disposed on one side of the touch peripheral area TPA where the touch pads TP are disposed. For example, the ground line GNL may be disposed between the sensing lines RL and the first or second driving lines TL1 and TL2 on the lower side of the touch peripheral area TPA. The end of the ground line GNL may be connected to the touch pads TP, and the other end of the ground line GNL may be extended to a region between the sensing lines RL and the first or second driving lines TL1 and TL2 which are disposed adjacent to each other. The ground line GNL may be grounded to a specific voltage level or earth through the touch pads TP. As the ground line GNL is grounded, it is possible to prevent interference between the sensing lines RL and the first or second driving lines TL1 and TL2.

The first guard line ESD1 may be extended along an outer periphery of the touch peripheral area TPA. For example, the first guard line ESD1 may be connected to the touch pads TP and may be extended along the lower edge, left edge and upper edge of the touch peripheral area TPA from the touch pads TP. The first guard line ESD1 is disposed along the outer peripheral of the touch peripheral area TPA, thereby dissipating static electricity when the static electricity is applied from the outside. The first guard line ESD1 can prevent static electricity from the outside from being introduced into the touch sensing unit 500.

The second guard line ESD2 may be extended along the other outer periphery of the touch peripheral area TPA. For example, the second guard line ESD2 may be connected to the touch pads TP and may be extended along the lower edge, right edge and upper edge of the touch peripheral area TPA from the touch pads TP. The second guard line ESD2 is disposed along another outer peripheral of the touch peripheral area TPA, thereby dissipating static electricity when the static electricity is applied from the outside. The second guard line ESD2 can prevent static electricity from the outside from being introduced into the touch sensing unit 500.

Figure 6:
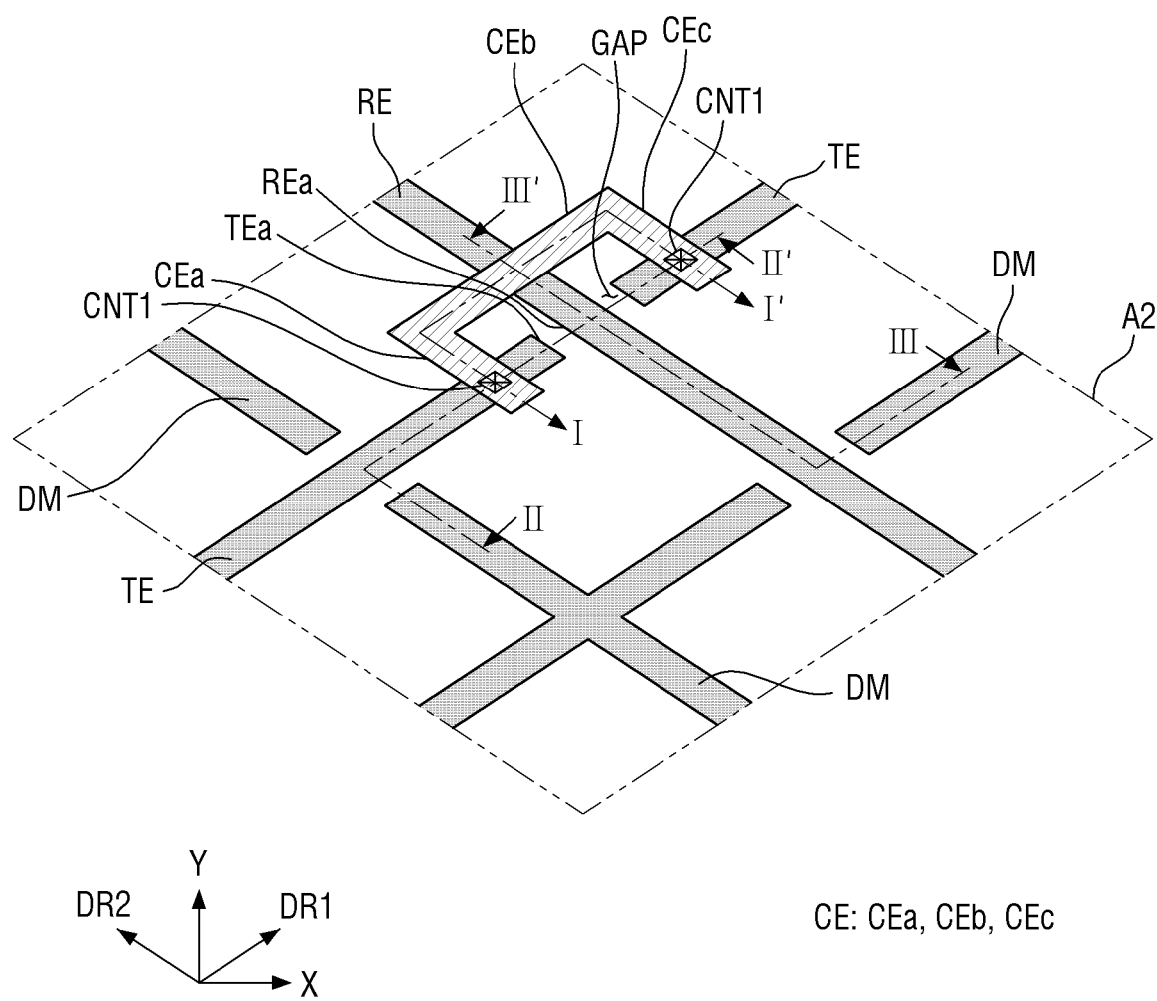
FIG. 6 is an enlarged view of area A2 of FIG. 5 according to an embodiment of the touch sensing unit.
Figure 7:
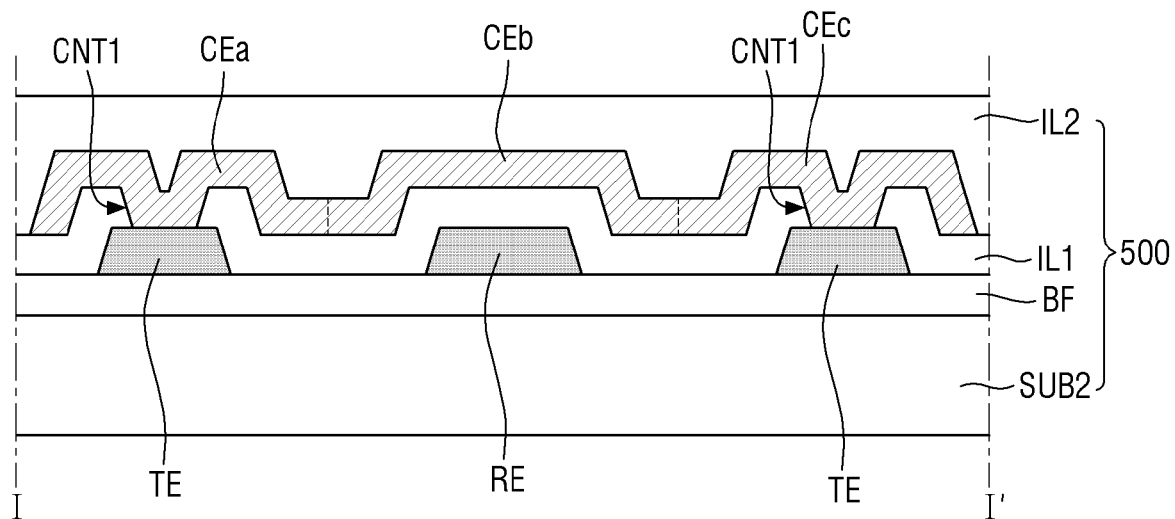
FIG. 7 is a cross-sectional view taken along line I-I' of FIG. 6.
Figure 8:
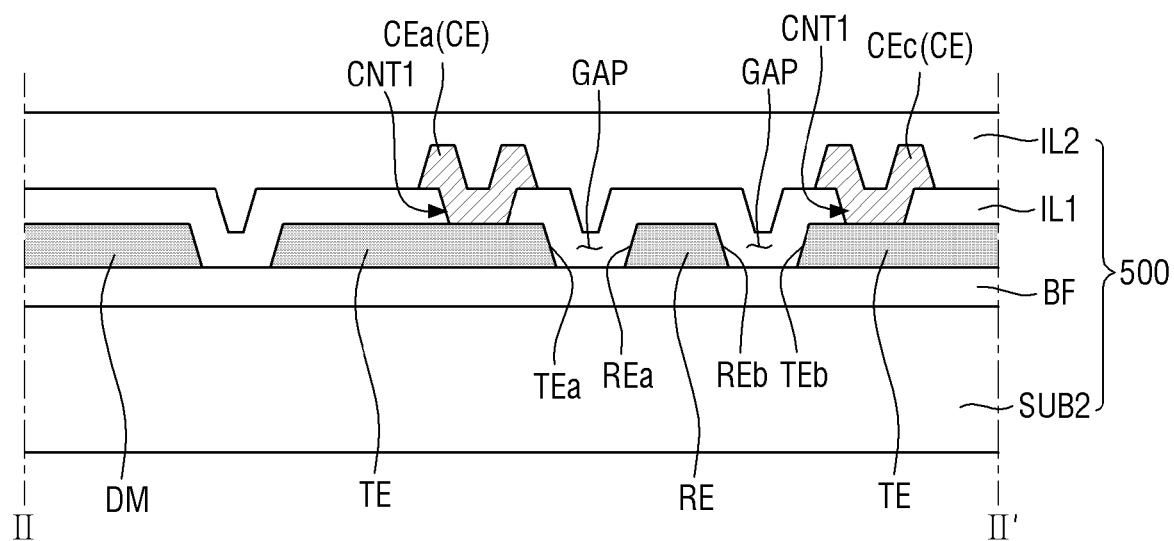
FIG. 8 is a cross-sectional view taken along line II-II' of FIG. 6.
Figure 9:
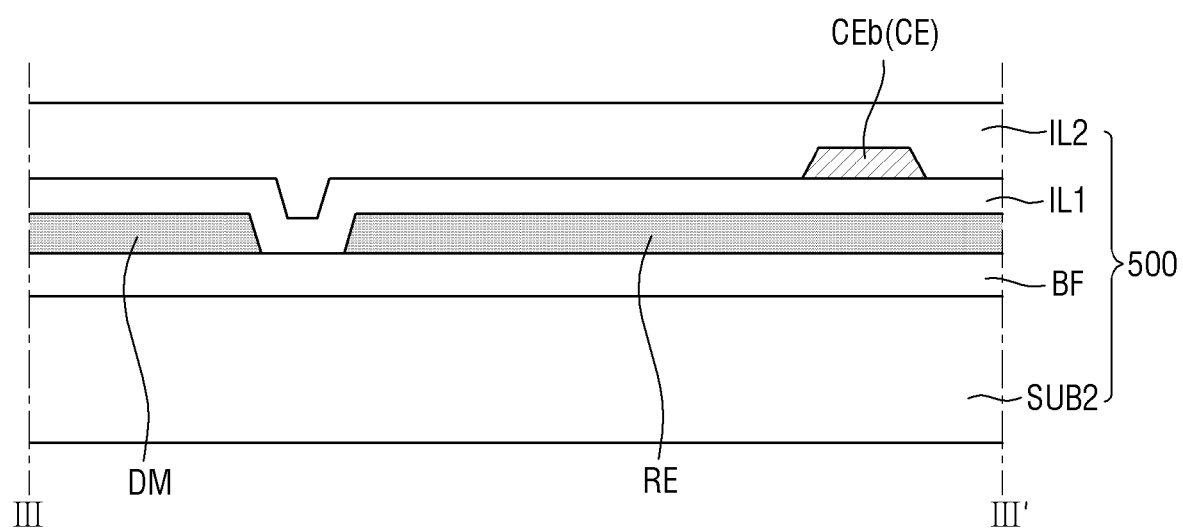
FIG. 9 is a cross-sectional view taken along line III-III' of FIG. 6.

FIG. 6 is an enlarged view of area A2 of FIG. 5 according to an embodiment of the touch sensing unit. FIG. 7 is a cross-sectional view taken along line I-I' of FIG. 6. FIG. 8 is a cross-sectional view taken along line II-II' of FIG. 6. FIG. 9 is a cross-sectional view taken along line III-III' of FIG. 6.

Referring to FIGS. 6 to 9, the touch sensing unit 500 may include a second substrate SUB2, a buffer layer BF, a plurality of driving electrodes TE, a plurality of sensing electrodes RE, a dummy pattern DM, a first insulating layer ILL a connection electrode CE, and a second insulating layer IL2.

The second substrate SUB2 may be a base substrate and/or a base member and may be made of an insulating material such as a polymer resin. For example, the second substrate SUB2 may be a rigid substrate. When the second substrate SUB2 is a rigid substrate, the second substrate SUB2 may include, but is not limited to, a glass material or a transparent metal material.

The buffer layer BF may be disposed on the second substrate SUB2. The buffer layer BF may be formed of an inorganic film that can prevent the permeation of air or moisture. For example, the buffer layer BF may include a plurality of inorganic films stacked on one another alternately. The buffer layer BF may be made up of, but is not limited to, multiple layers in which one or more inorganic layers of a silicon nitride layer, a silicon oxynitride layer, a silicon oxide layer, a titanium oxide layer and an aluminum oxide layer are alternately stacked on one another. Optionally, the buffer layer BF may be eliminated.

The driving electrodes TE, the sensing electrodes RE and the dummy pattern DM may be disposed on the buffer layer BF. The driving electrodes TE, the sensing electrodes RE and the dummy pattern DM may be disposed on same layer and may be made of the same material. The driving electrodes TE, the sensing electrodes RE and the dummy pattern DM may be spaced apart from one another and insulated from one another. For example, the plurality of driving electrodes TE, the plurality of sensing electrodes RE and the dummy pattern DM may be made up of a single layer or multiple layers including at least one of: molybdenum (Mo), molybdenum oxide (MoOx), molybdenum niobium (MoNb), molybdenum titanium (MoTi), APC (Ag—Pd—Cu) alloy, nickel (Ni), and copper (Cu).

The plurality of driving electrodes TE and/or the plurality of sensing electrodes RE may be extended in the direction DR1 and/or the direction DR2. For example, the plurality of driving electrodes TE or the plurality of sensing electrodes RE may replace a part of the dummy pattern DM having a mesh structure when viewed from the top. A virtual extension line extended in the direction DR1 may overlap the driving electrode TE, the sensing electrode RE, and the dummy pattern DM. In addition, the virtual extension line extended in the direction DR2 may overlap the driving electrode TE, the sensing electrode RE, and the dummy pattern DM. Therefore, the plurality of driving electrodes TE, the plurality of sensing electrodes RE and the dummy pattern DM are insulated from one another and have a generally mesh shape, thereby preventing the touch sensor layer TSL from being seen.

At each of the intersections of the driving electrodes TE and the sensing electrodes RE, two ends TEa and TEb of the neighboring driving electrodes TE may be spaced apart from each other with a portion of the sensing electrode RE therebetween. For example, the ends TEa and TEb of the driving electrodes TE may be spaced apart from each other with the sensing electrode RE therebetween, and may be insulated from the sensing electrode RE.

Regions, which are in the form of gaps GAP, may be disposed at the intersection of the driving electrodes TE and the sensing electrode RE to insulate the driving electrodes TE from the sensing electrode RE. For example, the gap GAP is located between one end TEa of the driving electrode TE and one end REa of the sensing electrode RE facing the one end TEa of the driving electrode TE. For example, the gap GAP is located between the other end TEb of the driving electrode TE and the other end REb of the sensing electrode RE facing the end TEb of the driving electrode TE. Accordingly, the gap GAP may be formed at the position where the driving electrode TE and the sensing electrode RE are closest to each other.

The first insulating layer IL1 may cover the plurality of driving electrodes TE, the plurality of sensing electrodes RE, and the dummy pattern DM. For example, the first insulating layer IL1 may be formed of an inorganic layer, for example, a silicon nitride layer, a silicon oxynitride layer, a silicon oxide layer, a titanium oxide layer, or an aluminum oxide layer.

The connection electrode CE may electrically connect between two ends TEa and TEb of the driving electrodes TE spaced apart from each other with the sensing electrode RE therebetween. The connection electrode CE may be disposed on the first insulating layer IL1 and may be connected to the driving electrode TE through a first contact hole CNT1. The connection electrode CE may be disposed on a different layer from the plurality of driving electrodes TE, the plurality of sensing electrodes RE and the dummy pattern DM, and the plurality of driving electrodes TE, and the plurality of sensing electrodes RE and the dummy pattern DM may be formed of different materials. The connection electrode CE may include a transparent conductive material that can transmit light. For example, the connection electrode CE may include, but is not limited to, at least one of indium tin oxide (ITO), indium zinc oxide (IZO) and indium tin zinc oxide (ITZO).

The connection electrode CE may not overlap the gap GAP formed between the end TEa of the driving electrode TE and the end REa of the sensing electrode RE, or the gap GAP formed between the other end TEb of the driving electrode TE and the other end REb of the sensing electrode RE. The connection electrode CE may be extended around the portion of the sensing electrode RE, such as the two ends REa and REb of the sensing electrode RE facing two ends TEa and TEb of the driving electrodes TE, respectively.

The connection electrode CE may include first to third connection portions CEa, CEb, and CEc. The first connection portion CEa may be connected to the end TEa of the driving electrode TE facing the gap GAP through the first contact hole CNT1. The extending direction of the first connection portion CEa may intersect the extending direction of the driving electrode TE, and may be parallel to the extending direction of the sensing electrode RE. For example, when the driving electrode TE is extended in the direction DR1 and the sensing electrode RE is extended in the direction DR2, the first connection portion CEa may be extended in the direction DR2.

The second connection portion CEb may be bent from the first connection portion CEa. The second connection portion CEb may be disposed between the first connection portion CEa and the third connection portion CEc. The extending direction of the second connection portion CEb may be parallel to the extending direction of the driving electrode TE, and may intersect the extending direction of the sensing electrode RE. For example, when the driving electrode TE is extended in the direction DR1 and the sensing electrode RE is extended in the direction DR2, the second connection portion CEb may extend in the direction DR1.

The second connection portion CEb may not overlap the driving electrode TE. The second connection portion CEb may not overlap the two ends TEa and TEb of the driving electrodes TE. The second connection portion CEb may intersect the sensing electrode RE at a point spaced apart from the gap GAP. In such case, the second connection portion CEb and the sensing electrode RE may be disposed on different layers, and may be insulated from each other by the first insulating layer IL1 interposed between the second connection portion CEb and the sensing electrode RE.

The third connection portion CEc may be bent from the second connection portion CEb. The third connection portion CEc may be connected to the end TEb of the driving electrode TE facing the gap GAP through the first contact hole CNT1. The extending direction of the third connection portion CEc may intersect the extending direction of the driving electrode TE, and may be parallel to the extending direction of the sensing electrode RE. For example, when the driving electrode TE is extended in the direction DR1 and the sensing electrode RE is extended in the direction DR2, the third connection portion CEc may extend in the direction DR2.

As such, the connection electrode CE may be bent at least once and may be extended around the gap GAP on one side thereof to electrically connect between the ends TEa and TEb of the driving electrodes TE. For example, the first to third connection portions CEa, CEb and CEc may be spaced apart from and at least partially surround the gap GAP.

Therefore, the connection electrode CE may not overlap the gap GAP where the driving electrode TE and the sensing electrode RE are closest to each other. For example, when static electricity occurs at and/or flows into the ends TEa and TEb of the driving electrodes TE, a portion of the first insulating layer IL1 adjacent to the ends TEa and TEb of the driving electrodes TE or corresponding to the gap GAP may be damaged, which may cause a short-circuit between the conductive patterns adjacent to the damaged portion of the first insulating layer IL1. For example, if a connection electrode to connect the ends TEa and TEb of the driving electrodes TE to each other overlaps the gap GAP, the damaged portion of the first insulating layer IL1 may cause the short-circuit between a portion of the connection electrode and the sensing electrode RE since the connection electrode is relatively close to the sensing electrode RE with the damaged portion therebetween. As the display device 10 includes the connection electrode CE that is extended around the gap GAP on one side thereof and does not overlap the gap GAP, it is possible to prevent a short-circuit from being created between the connection electrode CE and the sensing electrode RE even if the first insulating layer IL1 is damaged. As a result, the display device 10 may prevent the short-circuit between the connection electrode CE and the sensing electrode RE, thereby improving touch sensitivity and improving reliability of the touch sensing unit 500.

The second insulating layer IL2 may cover the connection electrode CE and the first insulating layer IL1. For example, the second insulating layer IL2 may be formed of an inorganic layer, for example, a silicon nitride layer, a silicon oxynitride layer, a silicon oxide layer, a titanium oxide layer, or an aluminum oxide layer. Optionally, the second insulating layer IL2 may provide a flat surface over the touch sensing unit 500.

Figure 10:
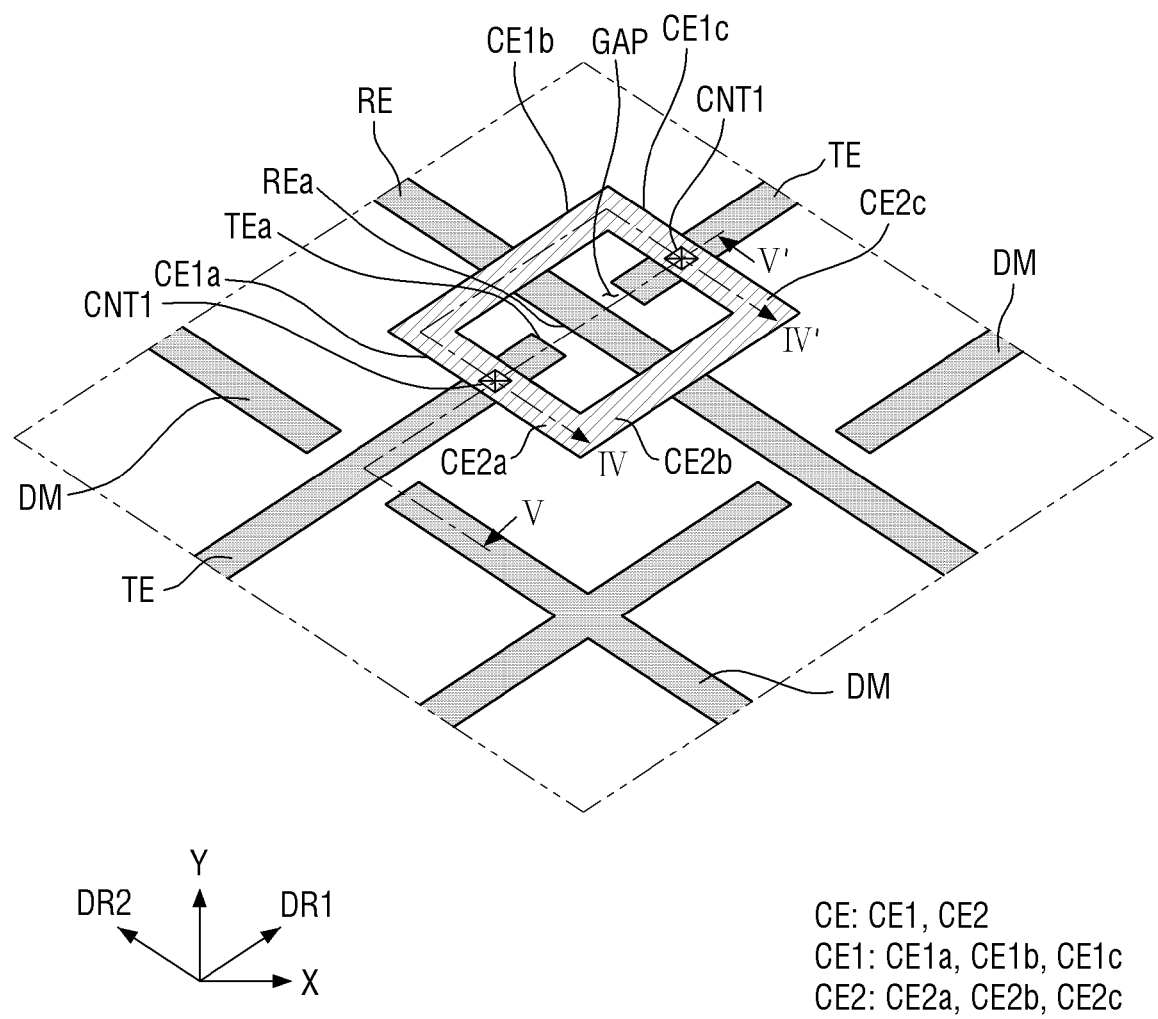
FIG. 10 is an enlarged view of area A2 of FIG. 5 according to another embodiment of the touch sensing unit.
Figure 11:
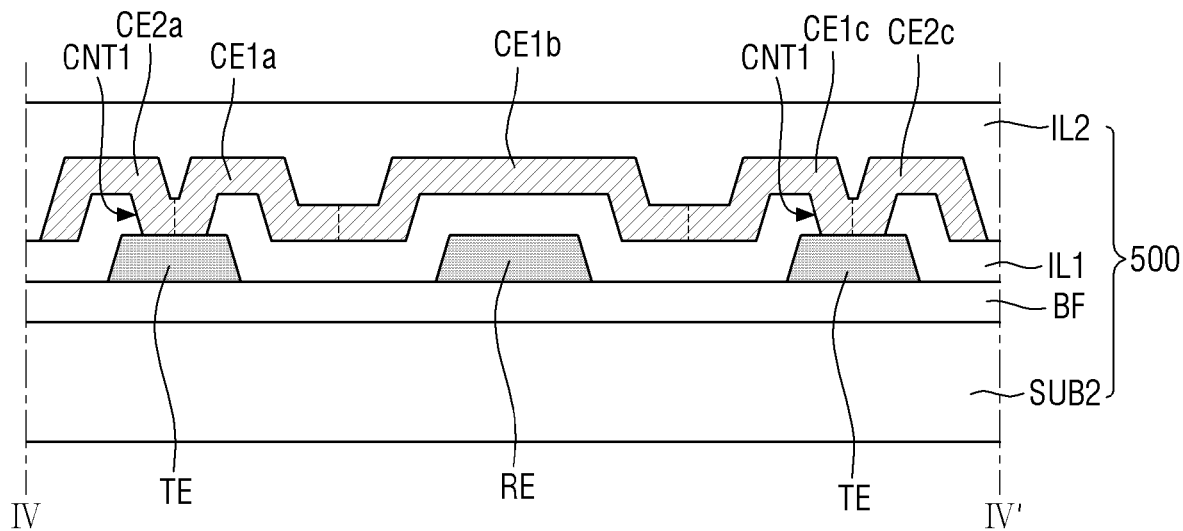
FIG. 11 is a cross-sectional view taken along line IV-IV' of FIG. 10.
Figure 12:
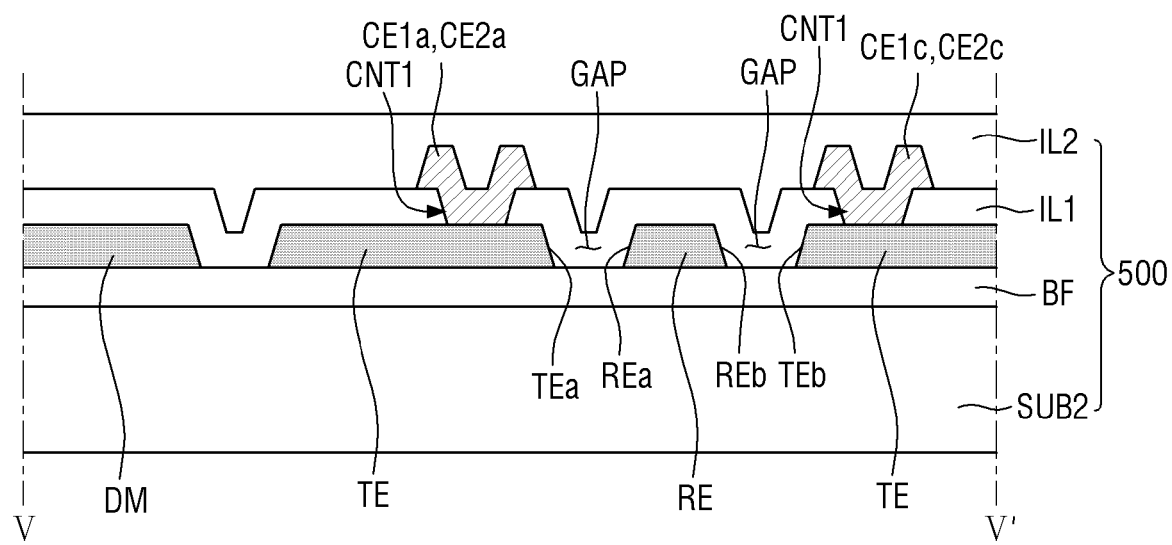
FIG. 12 is a cross-sectional view taken along line V-V of FIG. 10.

FIG. 10 is an enlarged view of area A2 of FIG. 5 according to another embodiment of the touch sensing unit. FIG. 11 is a cross-sectional view taken along line IV-IV' of FIG. 10. FIG. 12 is a cross-sectional view taken along line V-V of FIG. 10. The display device of FIGS. 10 to 12 is substantially identical to the display device of FIGS. 6 to 9 except for the configuration of a connection electrode CE; and, therefore, the redundant description will be omitted.

Referring to FIGS. 10 to 12, the touch sensing unit 500 may include a second substrate SUB2, a buffer layer BF, a plurality of driving electrodes TE, a plurality of sensing electrodes RE, a dummy pattern DM, a first insulating layer IL1, a connection electrode CE, and a second insulating layer IL2.

The driving electrodes TE, the sensing electrodes RE and the dummy pattern DM may be disposed on the buffer layer BF. The driving electrodes TE, the sensing electrodes RE and the dummy pattern DM may be disposed on same layer and may be made of the same material. The driving electrodes TE, the sensing electrodes RE and the dummy pattern DM may be spaced apart from one another and insulated from one another.

At each of the intersections of the driving electrodes TE and the sensing electrodes RE, two ends TEa and TEb of the driving electrodes TE may be spaced apart from each other with the sensing electrode RE therebetween. For example, the ends TEa and TEb of the driving electrodes TE may be spaced apart from each other with the sensing electrode RE therebetween, so that they may be insulated from the sensing electrode RE intersecting it.

Gaps GAP may be formed at the intersection of the driving electrodes TE and the sensing electrode RE. For example, the gap GAP is located between one end TEa of the driving electrode TE and one end REa of the sensing electrode RE facing the one end TEa of the driving electrode TE. For example, the gap GAP is located between the other end TEb of the driving electrode TE and the other end REb of the sensing electrode RE facing the end TEb of the driving electrode TE. Accordingly, the gap GAP may be formed at the position where the driving electrode TE is closest to the sensing electrode RE.

The connection electrode CE may electrically connect between two ends TEa and TEb of the driving electrodes TE spaced apart from each other with the sensing electrode RE therebetween. The connection electrode CE may be disposed on the first insulating layer IL1 and may be connected to the driving electrode TE through a first contact hole CNT1. The connection electrode CE may be disposed on a different layer from the plurality of driving electrodes TE, the plurality of sensing electrodes RE and the dummy pattern DM, and the plurality of driving electrodes TE, and the plurality of sensing electrodes RE and the dummy pattern DM may be formed of different materials. The connection electrode CE may include a transparent conductive material that can transmit light. For example, the connection electrode CE may include, but is not limited to, at least one of indium tin oxide (ITO), indium zinc oxide (IZO) and indium tin zinc oxide (ITZO).

The connection electrode CE may not overlap the gap GAP formed between the end TEa of the driving electrode TE and the end REa of the sensing electrode RE, or the gap GAP formed between the other end TEb of the driving electrode TE and the other end REb of the sensing electrode RE.

The connection electrode CE may include a first connection electrode CE1 and a second connection electrode CE2. The first connection electrode CE1 may be extended around the gap GAP on one side thereof to electrically connect the ends TEa and TEb of the driving electrodes TE to each other. The second connection electrode CE2 may be extended around the gap GAP on the opposite side thereof to electrically connect the ends TEa and TEb of the driving electrodes TE to each other. The first and second connection electrodes CE1 and CE2 may have a closed loop shape spaced apart from and surrounding the gap GAP. The first and second connection electrodes CE1 and CE2 may be symmetrical with respect to an extension line passing through the ends TEa and TEb of the driving electrodes TE. However, embodiments are not limited thereto. As the connection electrode CE includes the first and second connection electrodes CE1 and CE2, it is possible to stably connect the ends TEa and TEb of the driving electrodes TE to each other. For example, one of the first and second connection electrodes CE1 and CE2 may connect the ends TEa and TEb of the driving electrodes TE to each other even when the other one of the first and second connection electrodes CE1 and CE2 is disconnected from at least one of the ends TEa and TEb. The number of the connection electrodes CE is not particularly limited as long as the ends TEa and TEb of the driving electrodes TE facing each other may be connected by the first and second connection electrodes CE1 and CE2.

The first connection electrode CE1 may include first to third connection portions CE1$a$, CE1$b$ and CE1$c$, and the second connection electrode CE2 may include first to third connection portions CE2$a$, CE2$b$ and CE2$c$. In the following description, the first to third connection portions CE1$a$, CE1$b$ and CE1$c$ of the first connection electrode CE1 will be mainly described, and the first to third connection portions CE2$a$, CE2$b$, and CE2$c$ of the second connection electrode CE2 will not be described.

The first connection portion CE1$a$ may be connected to the end TEa of the driving electrode TE facing the gap GAP through the first contact hole CNT1. The extending direction of the first connection portion CE1$a$ may intersect the extending direction of the driving electrode TE, and may be parallel to the extending direction of the sensing electrode RE. For example, when the driving electrode TE is extended in the direction DR1 and the sensing electrode RE is extended in the direction DR2, the first connection portion CE1$a$ may extend in the direction DR2.

The second connection portion CE1$b$ may be bent from the first connection portion CE1$a$. The second connection portion CE1$b$ may be disposed between the first connection portion CE1$a$ and the third connection portion CE1$c$. The extending direction of the second connection portion CE1$b$ may be parallel to the extending direction of the driving electrode TE, and may intersect the extending direction of the sensing electrode RE. For example, when the driving electrode TE is extended in the direction DR1 and the sensing electrode RE is extended in the direction DR2, the second connection portion CE1$b$ may extend in the direction DR1.

The second connection portion CE1$b$ may not overlap the driving electrode TE. The second connection portion CE1$b$ may not overlap the two ends TEa and TEb of the driving electrodes TE. The second connection portion CE1$b$ may intersect the sensing electrode RE at a point spaced apart from the gap GAP. In such case, the second connection portion CE1$b$ and the sensing electrode RE may be disposed on different layers, and may be insulated from each other by the first insulating layer IL1 interposed between the second connection portion CE1$b$ and the sensing electrode RE.

The third connection portion CE1$c$ may be bent from the second connection portion CE1$b$. The third connection portion CE1$c$ may be connected to the end TEb of the driving electrode TE facing the gap GAP through the first contact hole CNT1. The extending direction of the third connection portion CE1$c$ may intersect the extending direction of the driving electrode TE, and may be parallel to the extending direction of the sensing electrode RE. For example, when the driving electrode TE is extended in the direction DR1 and the sensing electrode RE is extended in the direction DR2, the third connection portion CE1$c$ may extend in the direction DR2.

Therefore, the first and second connection electrodes CE1 and CE2 may not overlap the gap GAP where the driving electrode TE and the sensing electrode RE are closest to each other. For example, when static electricity occurs at and/or flows into the ends TEa and TEb of the driving electrodes TE, a portion of the first insulating layer IL1 adjacent to the ends TEa and TEb of the driving electrodes TE or corresponding to the gap GAP may be damaged. As the display device 10 includes the first and second connection electrodes CE1 and CE2 that are spaced apart from and surround the gap GAP, it is possible to prevent a short-circuit from being created between the connection electrode CE and the sensing electrode RE even if the first insulating layer IL1 is damaged. As a result, the display device 10 may prevent the short-circuit between the connection electrode CE and the sensing electrode RE, thereby improving touch sensitivity and improving reliability of the touch sensing unit 500.

Figure 13:
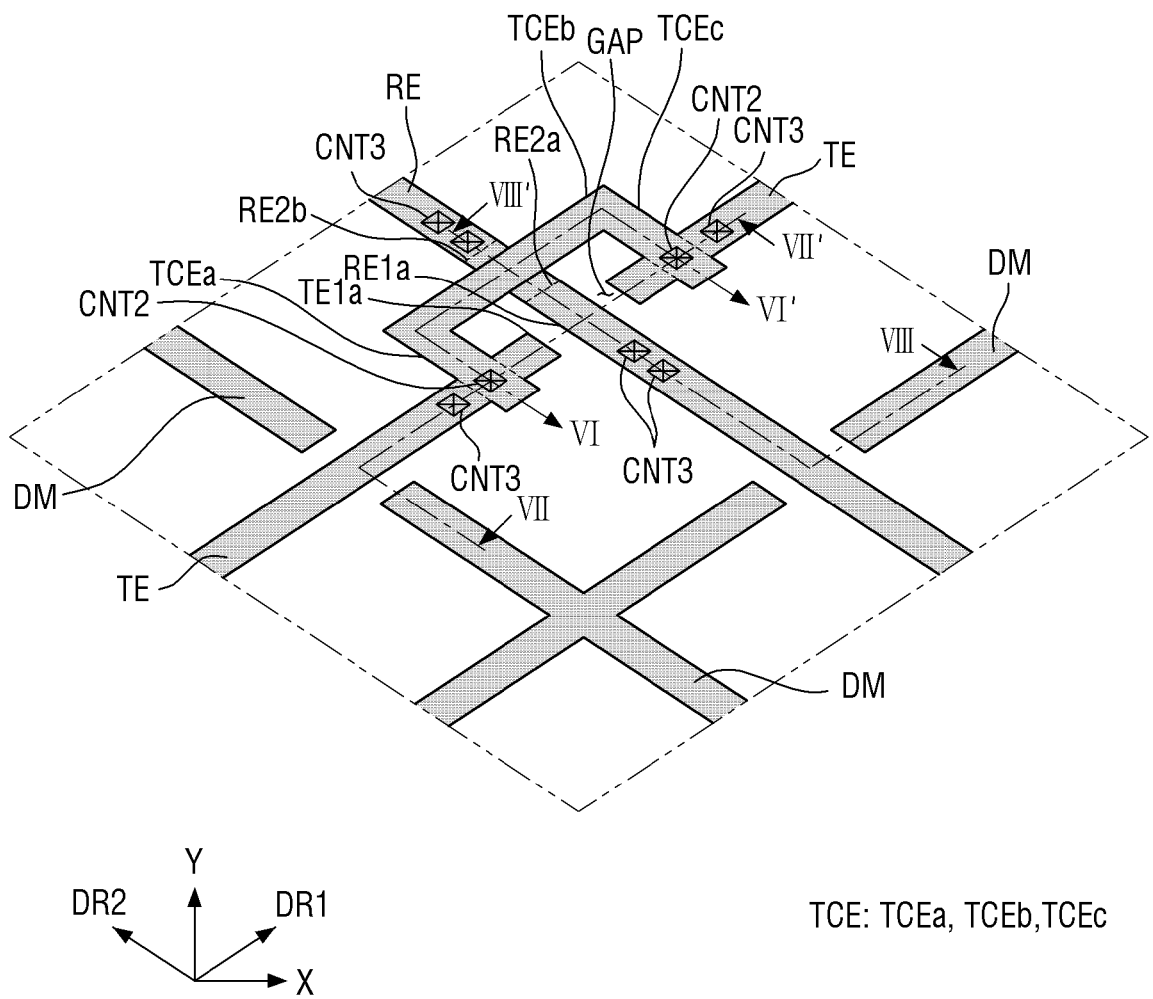
FIG. 13 is an enlarged view of area A2 of FIG. 5 according to still another embodiment of the touch sensing unit.
Figure 14:
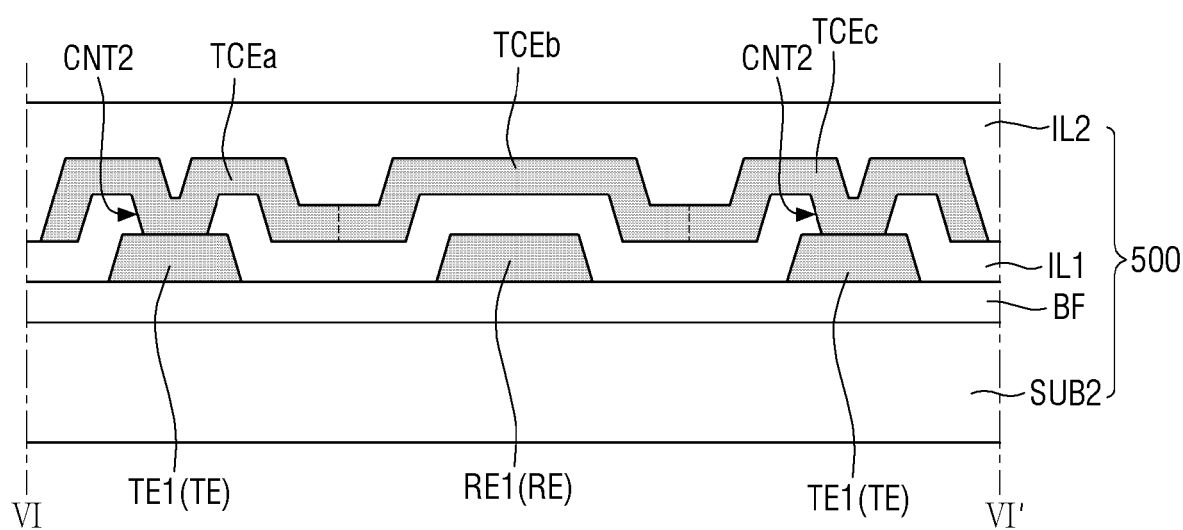
FIG. 14 is a cross-sectional view taken along line VI-VI' of FIG. 13.
Figure 15:
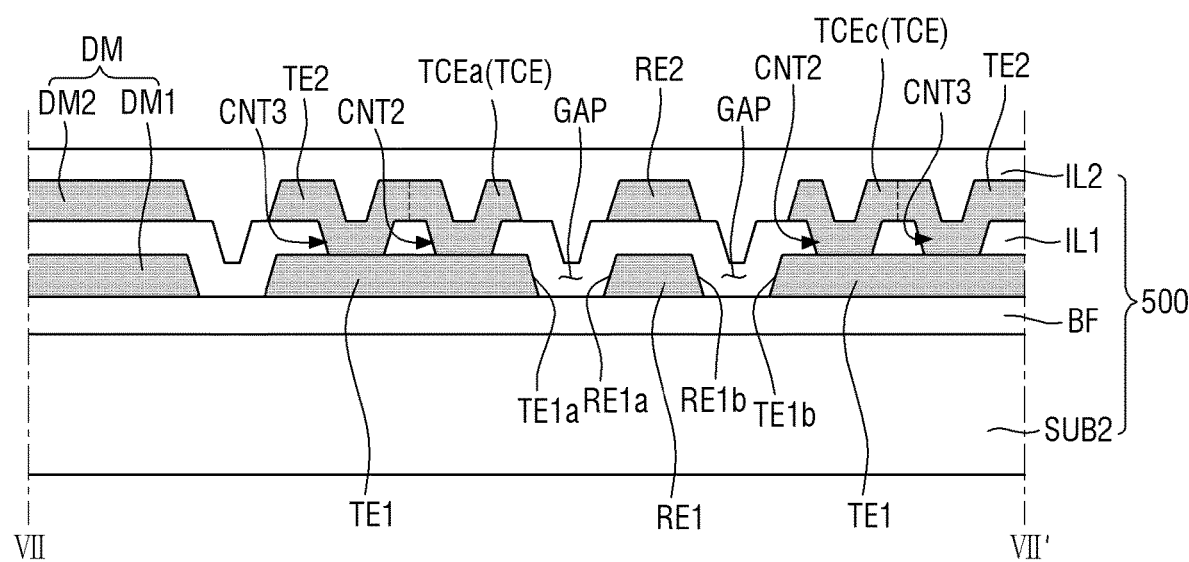
FIG. 15 is a cross-sectional view taken along line VII-VII' of FIG. 13.
Figure 16:
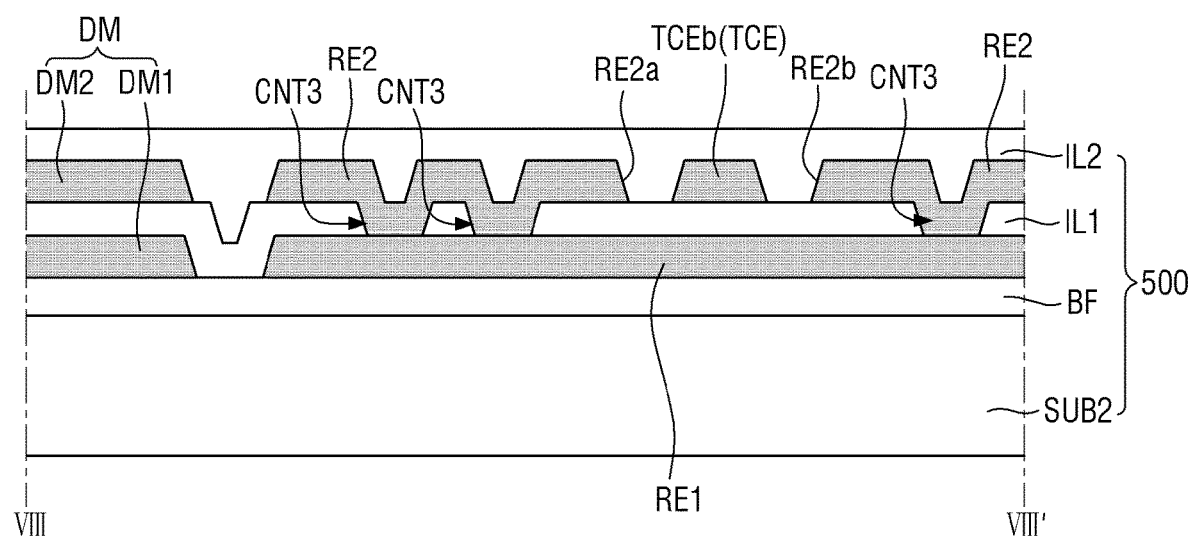
FIG. 16 is a cross-sectional view taken along line VIII-VIII' of FIG. 13.

FIG. 13 is an enlarged view of area A2 of FIG. 5 according to still another embodiment of the touch sensing unit. FIG. 14 is a cross-sectional view taken along line VI-VI' of FIG. 13. FIG. 15 is a cross-sectional view taken along line VII-VII' of FIG. 13. FIG. 16 is a cross-sectional view taken along line VIII-VIII' of FIG. 13.

Referring to FIGS. 13 to 16, the touch sensing unit 500 may include a second substrate SUB2, a buffer layer BF, a plurality of driving electrodes TE, a plurality of sensing electrodes RE, a dummy pattern DM, a first insulating layer ILL a connection electrode TCE, and a second insulating layer IL2.

The plurality of driving electrodes TE may include a plurality of first driving electrodes TE1 and a plurality of second driving electrodes TE2. The first and second driving electrodes TE1 and TE2 may have a multilayer structure with the first insulating layer IL1 therebetween, except for a region in which the connection electrode TCE is disposed. The second driving electrode TE2 may be connected to the first driving electrode TE1 through a third contact hole CNT3 penetrating through the first insulating layer IL1. It is to be noted that the configuration and arrangement of the third contact hole CNT3 connecting between the first and second driving electrodes TE1 and TE2 are not limited to that shown in FIG. 13.

The plurality of sensing electrodes RE may include a plurality of first sensing electrodes RE1 and a plurality of second sensing electrodes RE2. The first and second sensing electrodes RE1 and RE2 may have a multilayer structure with the first insulating layer IL1 therebetween, except for a region in which the connection electrode TCE is disposed. The second sensing electrode RE2 may be connected to the first sensing electrode RE1 through a third contact hole CNT3 penetrating through the first insulating layer IL1. It is to be noted that the configuration and arrangement of the third contact hole CNT3 connecting between the first and second sensing electrodes RE1 and RE2 are not limited to that shown in FIG. 13.

The dummy patterns DM may include a first dummy pattern DM1 and a second dummy pattern DM2. The first and second dummy patterns DM1 and DM2 may have a multilayer structure with the first insulating layer IL1 interposed therebetween. The second dummy pattern DM2 may be connected to the first dummy pattern DM1 through a plurality of contact holes penetrating through the first insulating layer IL1.

The driving electrodes TE, the sensing electrodes RE and the first dummy pattern DM1 may be disposed on the buffer layer BF. The plurality of first driving electrodes TE1, the plurality of first sensing electrodes RE1, and the first dummy pattern DM1 may be made of the same material on the same layer. The plurality of first driving electrodes TE1, the plurality of first sensing electrodes RE1, and the first dummy pattern DM1 may be spaced apart and insulated from each other. For example, the plurality of first driving electrodes TE1, the plurality of first sensing electrodes RE1 and the first dummy pattern DM1 may be made up of a single layer or multiple layers including at least one of: molybdenum (Mo), molybdenum oxide (MoOx), molybdenum niobium (MoNb), molybdenum titanium (MoTi), APC (Ag—Pd—Cu) alloy, nickel (Ni), and copper (Cu).

The plurality of first driving electrodes TE1 or the plurality of first sensing electrodes RE1 may be extended in the direction DR1 or the direction DR2. For example, the plurality of first driving electrodes TE1 or the plurality of first sensing electrodes RE1 may replace a part of the first dummy pattern DM1 having a mesh structure when viewed from the top. A virtual extension line extended in the direction DR1 may overlap the plurality of first driving electrodes TE1, the plurality of first sensing electrodes RE1, and the first dummy pattern DM1. In addition, a virtual extension line extended in the direction DR2 may overlap the plurality of first driving electrodes TE1, the plurality of first sensing electrodes RE1, and the first dummy pattern DM1. Therefore, the plurality of first driving electrodes TE1, the plurality of first sensing electrodes RE1 and the first dummy pattern DM1 are insulated from one another and have a generally mesh shape, thereby preventing the touch sensor layer TSL from being seen.

At each of the intersections of the first driving electrodes TE1 and the first sensing electrodes RE1, the ends TE1a and TE1b of the first driving electrodes TE1 may be spaced apart from each other with the first sensing electrode RE1 therebetween. For example, the ends TE1a and TE1b of the first driving electrodes TE1 may be spaced apart from each other with the intersecting first sensing electrode RE1 therebetween, so that they may be insulated from the intersecting first sensing electrode RE1.

Gaps GAP may be formed at the intersection of the first driving electrodes TE1 and the first sensing electrode RE1. For example, the gap GAP may be located between one end TE1a of the first driving electrode TE1 and one end RE1a of the first sensing electrode RE1 facing the end TE1a of the first driving electrode TE1. For example, the gap GAP may be located between one end TE1b of the first driving electrode TE1 and one end RE1b of the first sensing electrode RE1 facing the end TE1b of the first driving electrode TE1. Accordingly, the gap GAP may be formed at the position where the first driving electrode TE1 is closest to the first sensing electrode RE1.

The first insulating layer IL1 may cover the plurality of first driving electrodes TE1, the plurality of first sensing electrodes RE1, and the first dummy pattern DM1. For example, the first insulating layer IL1 may be formed of an inorganic layer, for example, a silicon nitride layer, a silicon oxynitride layer, a silicon oxide layer, a titanium oxide layer, or an aluminum oxide layer.

The connection electrode TCE may be extended from the second driving electrode TE2. The connection electrode CE may electrically connect between two ends TE1a and TE1b of the first driving electrodes TE1 spaced apart from each other with the first sensing electrode RE1 therebetween. The connection electrode TCE may be disposed on the first insulating layer IL1 and may be connected to the first driving electrode TE1 through a second contact hole CNT2. The connection electrode TCE may be made of the same material on the same layer as the plurality of second driving electrodes TE2, the plurality of second sensing electrodes RE2, and the second dummy pattern DM2. For example, the connection electrode TCE may be made up of a single layer or multiple layers including at least one of: molybdenum (Mo), molybdenum oxide (MoOx), molybdenum niobium (MoNb), molybdenum titanium (MoTi), APC (Ag—Pd—Cu) alloy, nickel (Ni), and copper (Cu).

The connection electrode TCE may not overlap the gap GAP formed between one end TE1a of the first driving electrode TE1 and one end RE1a of the first sensing electrode RE1, or the gap GAP formed between the other end TE1b of the first driving electrode TE1 and the other end RE1b of the first sensing electrode RE1. The connection electrode CE may be extended around a portion of the first sensing electrode RE1, such as the two ends RE1a and RE1b of the first sensing electrode RE1 facing two ends TE1a and TE1b of the first driving electrodes TE1.

The connection electrode TCE may include first to third connection portions TCEa, TCEb, and TCEc. The first connection portion TCEa may be extended from the second driving electrode TE2 and may be connected to the end TE1a of the first driving electrode TE1 facing the gap GAP through the second contact hole CNT2. The extending direction of the first connection portion TCEa may intersect the extending direction of the first driving electrode TE1, and may be parallel to the extending direction of the first sensing electrode RE1. For example, when the first driving electrode TE1 is extended in the direction DR1 and the first sensing electrode RE1 is extended in the direction DR2, the first connection portion TCEa may be extended in the direction DR2.

The second connection portion TCEb may be bent from the first connection portion TCEa. The second connection portion TCEb may be disposed between the first connection portion TCEa and the third connection portion TCEc. The extending direction of the second connection portion TCEb may be parallel to the extending direction of the first driving electrode TE1, and may intersect the extending direction of the first sensing electrode RE1. For example, when the first driving electrode TE1 is extended in the direction DR1 and the first sensing electrode RE1 is extended in the direction DR2, the second connection portion TCEb may be extended in the direction DR1.

The second connection portion TCEb may not overlap the first driving electrode TE1. The second connection portion TCEb may not overlap the ends TE1a and TE1b of the first driving electrodes TE1. The second connection portion TCEb may intersect the first sensing electrode RE1 at a point spaced apart from the gap GAP. In such case, the second connection portion TCEb and the first sensing electrode RE1 may be disposed on different layers, and may be insulated from each other by the first insulating layer IL1 interposed between the second connection portion TCEb and the first sensing electrode RE1. The ends RE2a and RE2b of the second sensing electrode RE2 may be spaced apart from each other with the second connection portion TCEb therebetween.

The third connection portion TCEc may be bent from the second connection portion TCEb. The third connection portion TCEc may be extended from the second driving electrode TE2 and may be connected to the other end TE1b of the first driving electrode TE1 facing the gap GAP through the second contact hole CNT2. The extending direction of the third connection portion TCEc may intersect the extending direction of the first driving electrode TE1, and may be parallel to the extending direction of the first sensing electrode RE1. For example, when the first driving electrode TE1 is extended in the direction DR1 and the first sensing electrode RE1 is extended in the direction DR2, the third connection portion TCEc may be extended in the direction DR2.

As such, the connection electrode TCE may be bent at least once and may be extended around the gap GAP on one side thereof to electrically connect between the ends TE1a and TE1b of the first driving electrodes TE1. For example, the first to third connection portions TCEa, TCEb and TCEc may be spaced apart from and at least partially surround the gap GAP.

Therefore, the connection electrode TCE may not overlap the gap GAP where the first driving electrode TE1 and the first sensing electrode RE1 are closest to each other. For example, when static electricity occurs at and/or flows into the ends TE1a and TE1b of the first driving electrodes TE1, a portion of the first insulating layer IL1 adjacent to the ends TE1a and TE1b of the first driving electrodes TE1 or corresponding to the gap GAP may be damaged. As the display device 10 includes the connection electrode TCE that is extended around the gap GAP on one side thereof and does not overlap the gap GAP, it is possible to prevent a short-circuit from being created between the connection electrode TCE and the first sensing electrode RE1 even if the first insulating layer IL1 is damaged. As a result, the display device 10 may prevent the short-circuit between the connection electrode TCE and the first sensing electrode RE1, thereby improving touch sensitivity and improving reliability of the touch sensing unit 500.

The second insulating layer IL2 may cover the plurality of second driving electrodes TE2, the plurality of second sensing electrodes RE2, the second dummy electrode DM2, the connection electrode TCE and the first insulating layer IL1. For example, the second insulating layer IL2 may be formed of an inorganic layer, for example, a silicon nitride layer, a silicon oxynitride layer, a silicon oxide layer, a titanium oxide layer, or an aluminum oxide layer. Optionally, the second insulating layer IL2 may provide a flat surface over the touch sensing unit 500.

Figure 17:
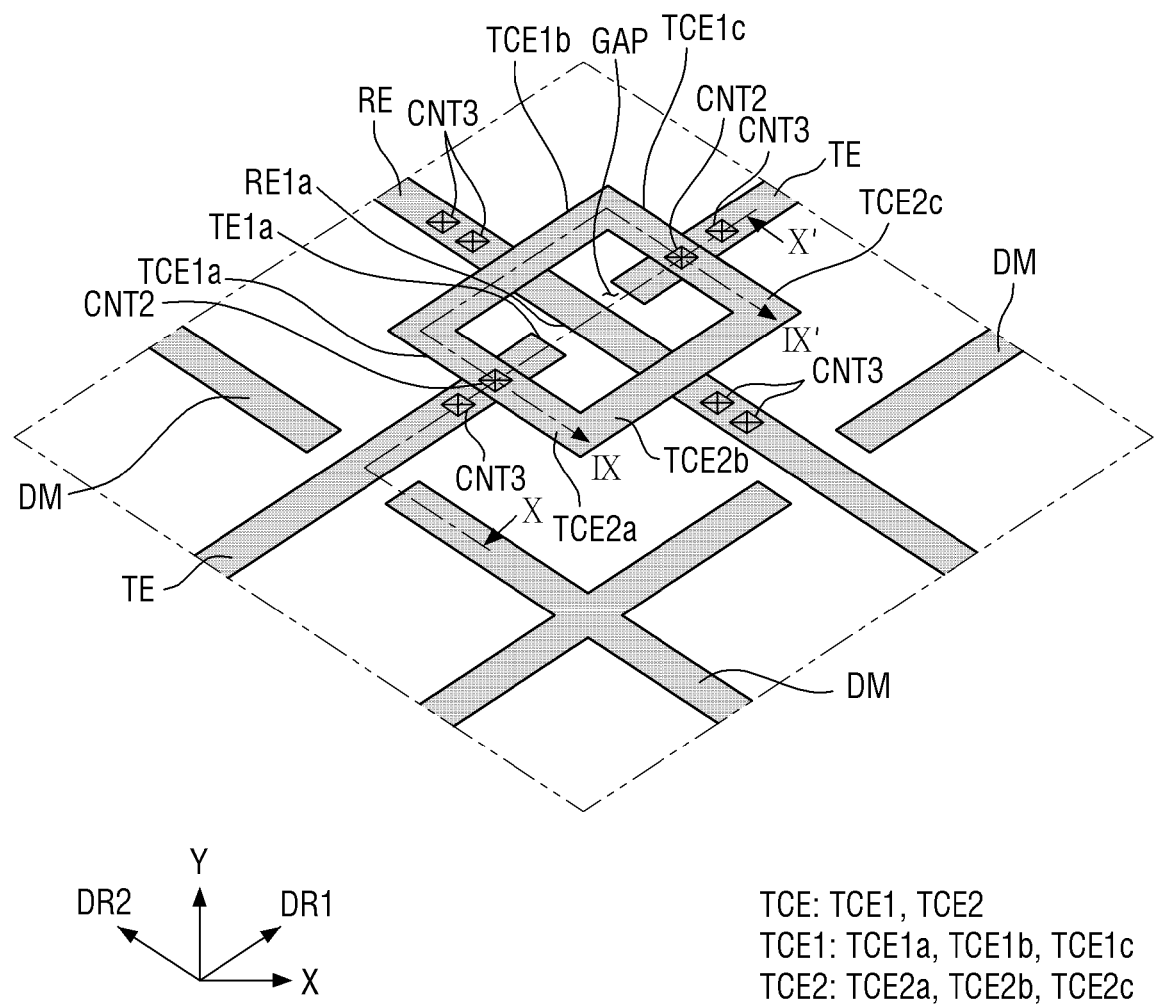
FIG. 17 is an enlarged view of area A2 of FIG. 5 according to yet another embodiment of the touch sensing unit.
Figure 18:
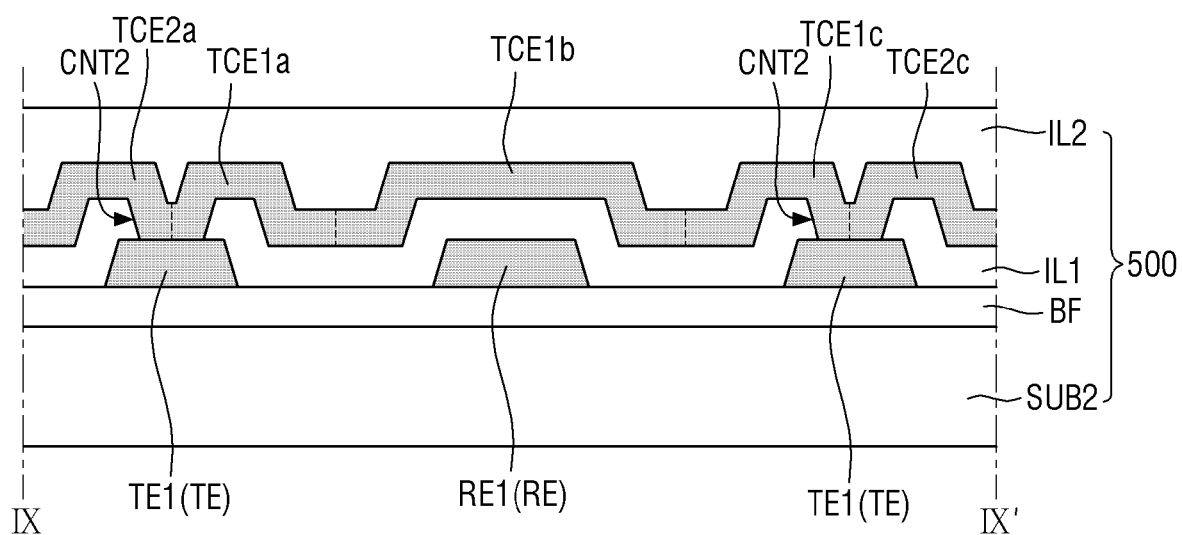
FIG. 18 is a cross-sectional view taken along line IX-IX' of FIG. 17.
Figure 19:
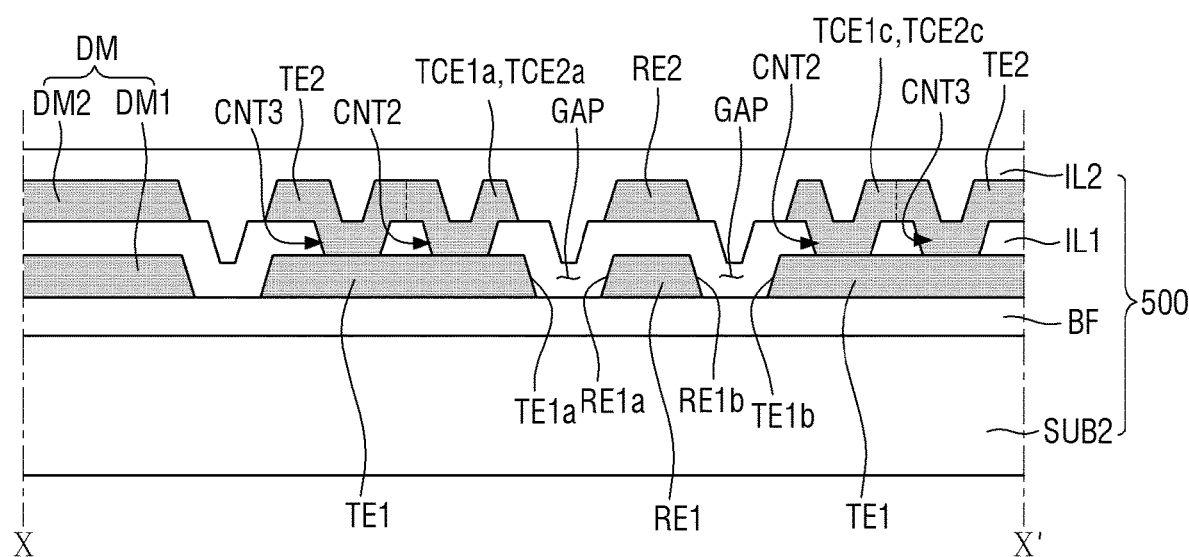
FIG. 19 is a cross-sectional view taken along line X-X' of FIG. 17.

FIG. 17 is an enlarged view of area A2 of FIG. 5 according to yet another embodiment of the touch sensing unit. FIG. 18 is a cross-sectional view taken along line IX-IX' of FIG. 17. FIG. 19 is a cross-sectional view taken along line X-X' of FIG. 17. The display device of FIGS. 17 to 19 is substantially identical to the display device of FIGS. 13 to 16 except for the configuration of a connection electrode TCE; and, therefore, the redundant description will be omitted.

Referring to FIGS. 17 to 19, the touch sensing unit 500 may include a second substrate SUB2, a buffer layer BF, a plurality of driving electrodes TE, a plurality of sensing electrodes RE, a dummy pattern DM, a first insulating layer ILL a connection electrode TCE, and a second insulating layer IL2.

The plurality of driving electrodes TE may include a plurality of first driving electrodes TE1 and a plurality of second driving electrodes TE2. The plurality of sensing electrodes RE may include a plurality of first sensing electrodes RE1 and a plurality of second sensing electrodes RE2. The dummy patterns DM may include a first dummy pattern DM1 and a second dummy pattern DM2.

The first driving electrodes TE1, the first sensing electrodes RE1 and the first dummy pattern DM1 may be disposed on the buffer layer BF. The plurality of first driving electrodes TE1, the plurality of first sensing electrodes RE1, and the first dummy pattern DM1 may be made of the same material on the same layer. The plurality of first driving electrodes TE1, the plurality of first sensing electrodes RE1, and the first dummy pattern DM1 may be spaced apart and insulated from each other.

At each of the intersections of the first driving electrodes TE1 and the first sensing electrodes RE1, the ends TE1a and TE1b of the first driving electrodes TE1 may be spaced apart from each other with the first sensing electrode RE1 therebetween. For example, the ends TE1a and TE1b of the first driving electrodes TE1 may be spaced apart from each other with the intersecting first sensing electrode RE1 therebetween, so that they may be insulated from the intersecting first sensing electrode RE1.

Gaps GAP may be formed at the intersection of the first driving electrodes TE1 and the first sensing electrode RE1. For example, the gap GAP may be located between one end TE1a of the first driving electrode TE1 and one end RE1a of the first sensing electrode RE1 facing the end TE1a of the first driving electrode TE1. For example, the gap GAP may be located between one end TE1b of the first driving electrode TE1 and one end RE1b of the first sensing electrode RE1 facing the end TE1b of the first driving electrode TE1. Accordingly, the gap GAP may be formed at the position where the first driving electrode TE1 is closest to the first sensing electrode RE1.

The connection electrode TCE may be extended from the second driving electrode TE2. The connection electrode CE may electrically connect between two ends TE1a and TE1b of the first driving electrodes TE1 spaced apart from each other with the first sensing electrode RE1 therebetween. The connection electrode TCE may be disposed on the first insulating layer IL1 and may be connected to the first driving electrode TE1 through a second contact hole CNT2. The connection electrode TCE may be made of the same material on the same layer as the plurality of second driving electrodes TE2, the plurality of second sensing electrodes RE2, and the second dummy pattern DM2. For example, the connection electrode TCE may be made up of a single layer or multiple layers including at least one of: molybdenum (Mo), molybdenum oxide (MoOx), molybdenum niobium (MoNb), molybdenum titanium (MoTi), APC (Ag—Pd—Cu) alloy, nickel (Ni), and copper (Cu).

The connection electrode TCE may not overlap the gap GAP formed between one end TE1a of the first driving electrode TE1 and one end RE1a of the first sensing electrode RE1, or the gap GAP formed between the other end TE1b of the first driving electrode TE1 and the other end RE1b of the first sensing electrode RE1.

The connection electrode TCE may include a first connection electrode TCE1 and a second connection electrode TCE2. The first connection electrode TCE1 may be extended around the gap GAP on one side thereof to electrically connect the ends TE1a and TE1b of the first driving electrodes TE1 to each other. The second connection electrode TCE2 may be extended around the gap GAP on the opposite side thereof to electrically connect the ends TE1a and TE1b of the first driving electrodes TE1 to each other. The first and second connection electrodes TCE1 and TCE2 may have a closed loop shape spaced apart from and surrounding the gap GAP. The first and second connection electrodes TCE1 and TCE2 may be symmetrical with respect to an extension line passing through the ends TE1a and TE1b of the first driving electrodes TE1. However, embodiments are not limited thereto. As the connection electrode TCE includes the first and second connection electrodes TCE1 and TCE2, it is possible to stably connect the ends TE1a and TE1b of the first driving electrodes TE1 to each other even when one of the first and second connection electrodes TCE1 and TCE2 is disconnected from at least one of the ends TEa and TEb. The number of the connection electrodes TCE is not particularly limited as long as the ends TE1a and TE1b of the first driving electrodes TE1 facing each other may be connected by the first and second connection electrodes TCE1 and TCE2.

The first connection electrode TCE1 may include first to third connection portions TCE1a, TCE1b and TCE1c, and the second connection electrode TCE2 may include first to third connection portions TCE2a, TCE2b and TCE2c. In the following description, the first to third connection portions TCE1a, TCE1b and TCE1c of the first connection electrode TCE1 will be mainly described, and the first to third connection portions TCE2a, TCE2b, and TCE2c of the second connection electrode TCE2 will not be described.

The first connection electrode TCE may include the first to third connection portions TCE1a, TCE1b and TCE1c. The first connection portion TCE1a may be extended from the second driving electrode TE2 and may be connected to the end TE1a of the first driving electrode TE1 facing the gap GAP through the second contact hole CNT2. The extending direction of the first connection portion TCE1a may intersect the extending direction of the first driving electrode TE1, and may be parallel to the extending direction of the first sensing electrode RE1. For example, when the first driving electrode TE1 is extended in the direction DR1 and the first sensing electrode RE1 is extended in the direction DR2, the first connection portion TCE1a may be extended in the direction DR2.

The second connection portion TCE1b may be bent from the first connection portion TCE1a. The second connection portion TCE1b may be disposed between the first connection portion TCE1a and the third connection portion TCE1c. The extending direction of the second connection portion TCE1b may be parallel to the extending direction of the first driving electrode TE1, and may intersect the extending direction of the first sensing electrode RE1. For example, when the first driving electrode TE1 is extended in the direction DR1 and the first sensing electrode RE1 is extended in the direction DR2, the second connection portion TCE1b may be extended in the direction DR1.

The second connection portion TCE1b may not overlap the first driving electrode TE1. The second connection portion TCE1b may not overlap the ends TE1a and TE1b of the first driving electrodes TE1. The second connection portion TCE1b may intersect the first sensing electrode RE1 at a point spaced apart from the gap GAP. In such case, the second connection portion TCE1b and the first sensing electrode RE1 may be disposed on different layers, and may be insulated from each other by the first insulating layer IL1 interposed between the second connection portion TCE1b and the first sensing electrode RE1. The ends RE2a and RE2b of the second sensing electrode RE2 may be spaced apart from each other with the second connection portion TCE1b therebetween.

The third connection portion TCE1c may be bent from the second connection portion TCE1b. The third connection portion TCE1c may be extended from the second driving electrode TE2 and may be connected to the other end TE1b of the first driving electrode TE1 facing the gap GAP through the second contact hole CNT2. The extending direction of the third connection portion TCE1c may intersect the extending direction of the first driving electrode TE1, and may be parallel to the extending direction of the first sensing electrode RE1. For example, when the first driving electrode TE1 is extended in the direction DR1 and the first sensing electrode RE1 is extended in the direction DR2, the third connection portion TCE1c may be extended in the direction DR2.

Therefore, the first and second connection electrode TCE1 and TCE2 may not overlap the gap GAP where the first driving electrode TE1 and the first sensing electrode RE1 are closest to each other. For example, when static electricity occurs at and/or flows into the ends TE1a and TE1b of the first driving electrodes TE1, a portion of the first insulating layer IL1 adjacent to the ends TE1a and TE1b of the first driving electrodes TE1 or corresponding to the gap GAP may be damaged. As the display device 10 includes the first and second connection electrodes TCE1 and TCE2 that are spaced apart from and surround the gap GAP, it is possible to prevent a short-circuit from being created between the connection electrode TCE and the first sensing electrode RE1 even if the first insulating layer IL1 is damaged. As a result, the display device 10 may prevent the short-circuit between the connection electrode TCE and the first sensing electrode RE1, thereby improving touch sensitivity and improving reliability of the touch sensing unit 500.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a base member;
   first sensing electrodes disposed on the base member and electrically connected to a first sensing line, wherein the first sensing electrodes include first and second ends facing and spaced apart from each other;
   a second sensing electrode disposed between the first and second ends of the first sensing electrodes on a same layer as the first sensing electrodes and electrically connected to a second sensing line;
   a connection electrode to electrically connect the first and second ends of the first sensing electrodes to each other without overlapping regions between each of the first and second ends of the first sensing electrodes and the second sensing electrode, the connection electrode intersecting the second sensing electrode at one or more points spaced apart from the regions; and a dummy pattern disposed on the same layer as the first sensing electrodes and the second sensing electrode,
wherein the dummy pattern comprises:
a first portion extending in a first direction and disposed on a first extension line of the first sensing electrodes; and
a second portion extending in a second direction to intersect the first portion and disposed on a second extension line of the second electrode.

2. The display device of claim 1, wherein the regions comprises gaps and the connection electrode comprises:
a first connection portion connected to the first end of the first sensing electrodes that faces one of the gaps;
a second connection portion bent from the first connection portion; and
a third connection portion bent from the second connection portion and connected to the second end of the first sensing electrodes that faces the other one of the gaps.

3. The display device of claim 2, wherein the second connection portion is parallel to the first sensing electrodes and does not overlap the first sensing electrodes.

4. The display device of claim 2, wherein the second connection portion intersects the second sensing electrode at the at one or more points spaced apart from the gaps.

5. The display device of claim 2, wherein each of the first connection portion and the third connection portion is parallel to the second sensing electrode.

6. The display device of claim 1, wherein the regions comprises gaps and the connection electrode comprises:
a first connection electrode extending around the gaps on one side thereof to electrically connect the first and second ends of the first sensing electrodes to each other; and
a second connection electrode extending around the gaps on an opposite side thereof to electrically connect the first and second ends of the first sensing electrodes to each other.

7. The display device of claim 6, wherein the first connection electrode and the second connection electrode have a closed loop shape surrounding the gaps.

8. The display device of claim 6, wherein the first connection electrode and the second connection electrode are symmetrical with respect to the first extension line passing through the first and second ends of the first sensing electrodes.

9. The display device of claim 6, wherein each of the first and second connection electrodes comprises:
a first connection portion connected to the first end of the first sensing electrodes that faces one of the gaps;
a second connection portion bent from the first connection portion; and
a third connection portion bent from the second connection portion and connected to the second end of the first sensing electrodes that faces the other one of the gaps.

10. The display device of claim 9, wherein the second connection portion of each of the first and second connection electrodes intersects the second sensing electrode at the points spaced apart from the gaps.

11. The display device of claim 1, wherein each of the first and second ends of the first sensing electrodes is disposed on the first extension line passing through the first direction, and wherein the second sensing electrode extends in the second direction crossing the first direction between the first and second ends of the first sensing electrodes.

12. The display device of claim 11, wherein the dummy pattern has a mesh shape consisting of electrodes extending in the first direction and electrodes extending in the second direction.

13. A display device comprising:
a base member;
first driving electrodes disposed on the base member and electrically connected to a first sensing line, wherein the first driving electrodes include first and second ends facing and spaced apart from each other;
second driving electrodes disposed on the first driving electrodes and electrically connected to the first driving electrodes;
a first sensing electrode disposed between the first and second ends of the first driving electrodes on a same layer as the first driving electrodes and electrically connected to a second sensing line;
a second sensing electrode disposed on a same layer as the second driving electrodes and electrically connected to the first sensing electrode; and
a connection electrode to electrically connect the first and second ends of the first driving electrodes to each other;
a first dummy pattern disposed on the same layer as the first driving electrodes and the first sensing electrode; and
a second dummy pattern disposed on the same layer as the second driving electrodes and the second sensing electrode,
wherein the connection electrode is disposed on the same layer as the second driving electrodes and extends around a portion of the first sensing electrode that faces each of the first and second ends of the first driving electrodes,
wherein the connection electrode intersects the first sensing electrode at one or more points spaced apart from the portion of the first sensing electrode, and
wherein the first dummy pattern comprises:
a first portion extending a first direction and disposed on a first extension line of the first driving electrodes, and
a second portion extending in a second direction to intersect the first portion and disposed on a second extension line of the first sensing electrode.

14. The display device of claim 13, wherein the connection electrode comprises:
a first connection portion connected to the first end of the first driving electrodes;
a second connection portion bent from the first connection portion; and
a third connection portion bent from the second connection portion and connected to the second end of the first driving electrodes.

15. The display device of claim 14, wherein portions of the second sensing electrode are spaced apart from each other with the second connection portion therebetween.

16. The display device of claim 14, wherein the second connection portion is parallel to the first driving electrodes or the second driving electrodes and does not overlap the first driving electrodes or the second driving electrodes.

17. The display device of claim 14, wherein the second connection portion intersects the first sensing electrode at the one or more points, the one or more points being spaced apart from gaps disposed between the portion of the first sensing electrode and each of the first and second ends of the first driving electrodes.

18. The display device of claim 13, wherein the connection electrode comprises:
- a first connection electrode extending around the portion of the first sensing electrode on one side thereof to electrically connect the first and second ends of the first driving electrodes to each other; and
- a second connection electrode extending around the portion of the first sensing electrode on an opposite side thereof to electrically connect the first and second ends of the first driving electrodes to each other.

19. The display device of claim 18, wherein each of the first and second connection electrodes comprises:
- a first connection portion connected to the first end of the first driving electrodes;
- a second connection portion bent from the first connection portion; and
- a third connection portion bent from the second connection portion and connected to the second end of the first driving electrodes.

20. The display device of claim 19, wherein the second connection portion of each of the first and second connection electrodes intersects the first sensing electrode at the points, the points being spaced apart from gaps disposed between the portion of the first sensing electrode and each of the first and second ends of the first driving electrodes.

* * * * *